US009552915B2

United States Patent
Khan et al.

(10) Patent No.: US 9,552,915 B2
(45) Date of Patent: Jan. 24, 2017

(54) POLYMORPHIC SURFACE SYSTEMS AND METHODS

(71) Applicant: Maieutic Enterprises Inc., Oakville, Ontario (CA)

(72) Inventors: Asif Khan, Oakville (CA); Nemanja Kliska, Whitby (CA); Nicholas George Vardy, Pickering (CA); Alexander Steven Ross, Hamilton (CA)

(73) Assignee: Maieutic Enterprises Inc. (CA)

( * ) Notice: Subject to any disclaimer, the term of this patent is extended or adjusted under 35 U.S.C. 154(b) by 0 days.

(21) Appl. No.: 14/633,110

(22) Filed: Feb. 26, 2015

(65) Prior Publication Data

US 2015/0248960 A1  Sep. 3, 2015

Related U.S. Application Data

(60) Provisional application No. 61/946,740, filed on Mar. 1, 2014, provisional application No. 62/041,632, filed on Aug. 25, 2014.

(51) Int. Cl.
*H01F 7/08* (2006.01)

(52) U.S. Cl.
CPC ........... *H01F 7/08* (2013.01); *H01F 2007/086* (2013.01)

(58) Field of Classification Search
CPC ............ H01F 1/44; H01F 7/064; H01F 7/206; H01F 7/08; H01F 2007/086
USPC ........................................ 361/143
See application file for complete search history.

(56) References Cited

U.S. PATENT DOCUMENTS

| 1,989,680 A | 2/1935 | Carver et al. |
| 2,010,407 A | 8/1935 | Matthias |
| 2,266,457 A | 12/1941 | Wolff |
| 2,378,039 A | 6/1945 | Schenker |
| 3,696,456 A | 10/1972 | Dunham et al. |
| 4,876,758 A | 10/1989 | Rolloff et al. |

(Continued)

FOREIGN PATENT DOCUMENTS

| DE | 596762 | 5/1934 |
| DE | 2821247 | 11/1979 |

(Continued)

OTHER PUBLICATIONS

PCT/CA2015/000133, Written Opinion, mailed Jun. 9, 2015.

(Continued)

*Primary Examiner* — Ann Hoang
(74) *Attorney, Agent, or Firm* — Steven M. Greenberg; CRGO Law

(57) ABSTRACT

A polymorphic surface may be provided by applying at least one magnetic field across a plurality of movable surface contour elements and selectively passing a current through the magnetic field(s) adjacent selected surface contour elements, with the current being perpendicular to the magnetic field. The current interacts with the magnetic field to generate a Lorentz force driving guided substantially linear motion of the respective surface contour element(s). The surface contour elements may be individually moveable and individually selectable for application of current to generate movement. The surface contour elements may be supported in position after removing the current. The current applied across each selected surface contour element may be varied to control the amount of guided substantially linear motion.

18 Claims, 37 Drawing Sheets

(56) References Cited

U.S. PATENT DOCUMENTS

| | | | |
|---|---|---|---|
| 4,932,852 A | 6/1990 | Suzuki | |
| 5,015,429 A | 5/1991 | Suzuki | |
| 5,640,779 A | 6/1997 | Rolloff et al. | |
| 6,125,338 A | 9/2000 | Brienza et al. | |
| 6,160,264 A | 12/2000 | Rebiere | |
| 6,298,587 B1 | 10/2001 | Vollom | |
| 6,654,705 B1 | 11/2003 | Benson et al. | |
| 6,700,563 B1 | 3/2004 | Koizumi | |
| 6,847,915 B2 | 1/2005 | Liang et al. | |
| 6,860,784 B2 | 3/2005 | Chernov et al. | |
| 6,907,672 B2 | 6/2005 | Said | |
| 7,047,657 B2 | 5/2006 | Goeggelmann et al. | |
| 7,617,068 B2 | 11/2009 | Tadin et al. | |
| 7,654,021 B2 | 2/2010 | Kleyman et al. | |
| 7,997,891 B2 | 8/2011 | Gallagher et al. | |
| 8,290,739 B2 | 10/2012 | Tadin et al. | |
| 2004/0159974 A1 | 8/2004 | Fischer | |

FOREIGN PATENT DOCUMENTS

| | | | |
|---|---|---|---|
| DE | 4228821 | 3/1994 | |
| DE | 10127343 | 12/2002 | |
| DE | 102011006980 | 10/2012 | |
| DE | 102011055239 | 5/2013 | |
| JP | 08005357 | 1/1996 | |
| JP | 2005055767 A * | 3/2005 | ............ G09B 21/00 |
| WO | 9423605 | 10/1994 | |
| WO | 2010018326 A1 | 2/2010 | |
| WO | 2011034434 | 3/2011 | |
| WO | 2012164207 A1 | 12/2012 | |
| WO | 2013098514 A1 | 7/2013 | |
| WO | 2013109708 | 7/2013 | |

OTHER PUBLICATIONS

CA2894983, Notice of Allowance, mailed Oct. 5, 2015.
Shutov. M.V. et al., A Microfabricated Electromagnetic Linear Synchronous Motor, Sensors and Actuators, vol. A 121, 2005, pp. 566-575.
Fujiwara R. et al., Positioning Characteristics of a MEMS Linear Motor Utilizing a Thin Film Permanent Magnet and DLC Coating, Int. J. of Automation Technology, vol. 7, No. 2, 2013, pp. 148-155.
PCT/CA2015/000133; International Search Report; Feb. 27, 2015.
Follmer, Leithinger, Olwal, Hogge, Ishii, "inFORM: Dynamic Physical Affordances and Constraints through Shape and Object Actuation," MIT Media Lab, UIST' 13, Oct. 8-11, 2013.
Yong-Tai Im et al., A Comparison of Pin Actuation Schemes for Large-Scale Discrete Dies, Journal of Manufacturing Processes, vol. 2, No. 4, 2000, pp. 247-257.
Ming-Zhe Li et al., Flexible Manufacturing of Sheet Metal Parts Based on Digitized-Die, Robotics and Computer-Integrated Manufacturing 23, , pp. 107-115, (2007).
Xiaobo Yu et al., Finite Element Simulations of the Double-diaphram Forming Process, Revue Europeenne des Elements, 14:6-7, pp. 633-651, (2005).
Stanley O. Starr et al., A Low Voltage "Railgun," American Journal of Physics 81, Jan. 2013, pp. 38-43.
B.G. Zhukov et al., A Compact Railgun Accelerator for Millimiter-Sized Dielectric Solid Armatures, Technical Physics Letters, 2013, vol. 39, No. 6, pp. 569-572.
S.A. Poniaev et al., Small-Size Railgun of mm-Size Solid Bodies for Hypervelocity Material Testing, Acta Astronautica (2014).
Mohammad Amini et al., Design, Fabrication, and Use of a New Reconfigurable Discrete Die for Forming Tubular Parts, International Journal Manufacturing Technology (2014), 75:1055-1063.
Bahattin Koc, et al., Design and Analysis of a Reconfigurable Discrete Pin Tooling System for Molding of Three-Dimensional Free-Form Objects.
Hu Fuwen, Location Issues of Thin Shell Parts in the Reconfigurable Fixture for Trimming Operation, J. Aerosp. Technol. Manag., Sao Jose dos Campos, vol. 6, No. 3, pp. 319-331, Jul.-Sep. 2014.
Daniel F. Walczyk, PhD, PE, Rapid and Reconfigurable Tooling Methods for Manufacturing Large-Scale Plastic and Composite Parts, Center for Automation Technologies and Systems.
Chris Munro et al., Reconfigurable Pin-Type Tooling: a Survey of Prior Art and Reduction to Practice, Journal of Manufacturing Science and Engineering, Jun. 2007, vol. 129, pp. 551-565.
Jorge Cortes et al., Reconfigurable Tooling by Using a Reconfigurable Material, Tecnologico de Monterey, Campus Monterrey, Mexico, www.intechopen.com, pp. 69-92.
Haihong Zhu et al., Construction and Control of Massive Hydraulic Micro-actuator-sensor Array, 2006.
Zhijian Wang et al., Rapid Manufacturing of Vacuum Forming Components Utilising Reconfigurable Screw-Pin Tooling, Aug. 2009.
Haihong Zhu, Practical Structural Design and Control for Digital Clay, Woodruff School of Mechanical Engineering Georgia Institute of Technology, Jul. 2005.
Zhong-Yi Cai et al., Multi-Point Forming of Three-Dimensional Sheet Metal and the Control of the Forming Process, International Journal of Pressure Vessels and Piping 79 (2002), pp. 289-296.
M.Z. Li et al., Multi-Point Forming Technology for Sheet Metal, Journal of Materials Processing Technology 129 (2002), pp. 333-338.
Linfa Peng, et al., Transition Surface Design for Blank Holder in Multi-Point Forming, International Journal of Machine Tools & Manufacture 46 (2006). pp. 1336-1342.
M.G. Mehr Abi et al., Reconfigurable Manufacturing Systems: Key to Future Manufacturing, Journal of Intelligent Manufacturing (2000) 11, pp. 403-419.
Edwin Haas et al., Design and Test of a Reconfigurable Forming Die, Journal of Manufacturing Processes, vol. 4, No. 1, 2002.
P.V.M. Rao et al., A Flexible Surface Tooling for Sheet-Forming Processes: Conceptual Studies and Numerical Simulation, Journal of Materials Processing Technology 124 (2002), pp. 133-143.
Y. Wang et al., Automated Discrete-Pin Adjustment for Reconfigurable Moulding Machine, International Journal of Computer Integrated Manufacturing, vol. 23, No. 3, Mar. 2010, pp. 229-236.
Viorel Paunoiu et al., Numerical Analysis of Multipoint Forming Process, International Journal of Modern Manufacturing Technologies, vol. 3, No. 2, pp. 85-90, 2011.
Troy Michigan, Goodbye Machining Reconfiguring Pin Tooling, Surface Generation Ltd, Sep. 2008.
Michael Skinner, SAMPE '06 Showcases Innovation, Reinforced Plastics, Jul./Aug. 2006, pp. 36-42.
Nikolaj Kjelgaard Vedel-Smith et al., Casting Traceability with Direct Part Marking Using Reconfigurable Pin-Type Tooling Based on Paraffin-Graphite Actuators, Journal of Manufacturing Systems 31, (2012), pp. 113-120.
N.J. Cook et al., A Novel Multipin Positioning System for the Generation of High-Resolution 3-D Profiles by Pin-Arrays, IEEE Transactions on Automation Science and Engineering, vol. 5, No. 2, Apr. 2008, pp. 216-222.

* cited by examiner

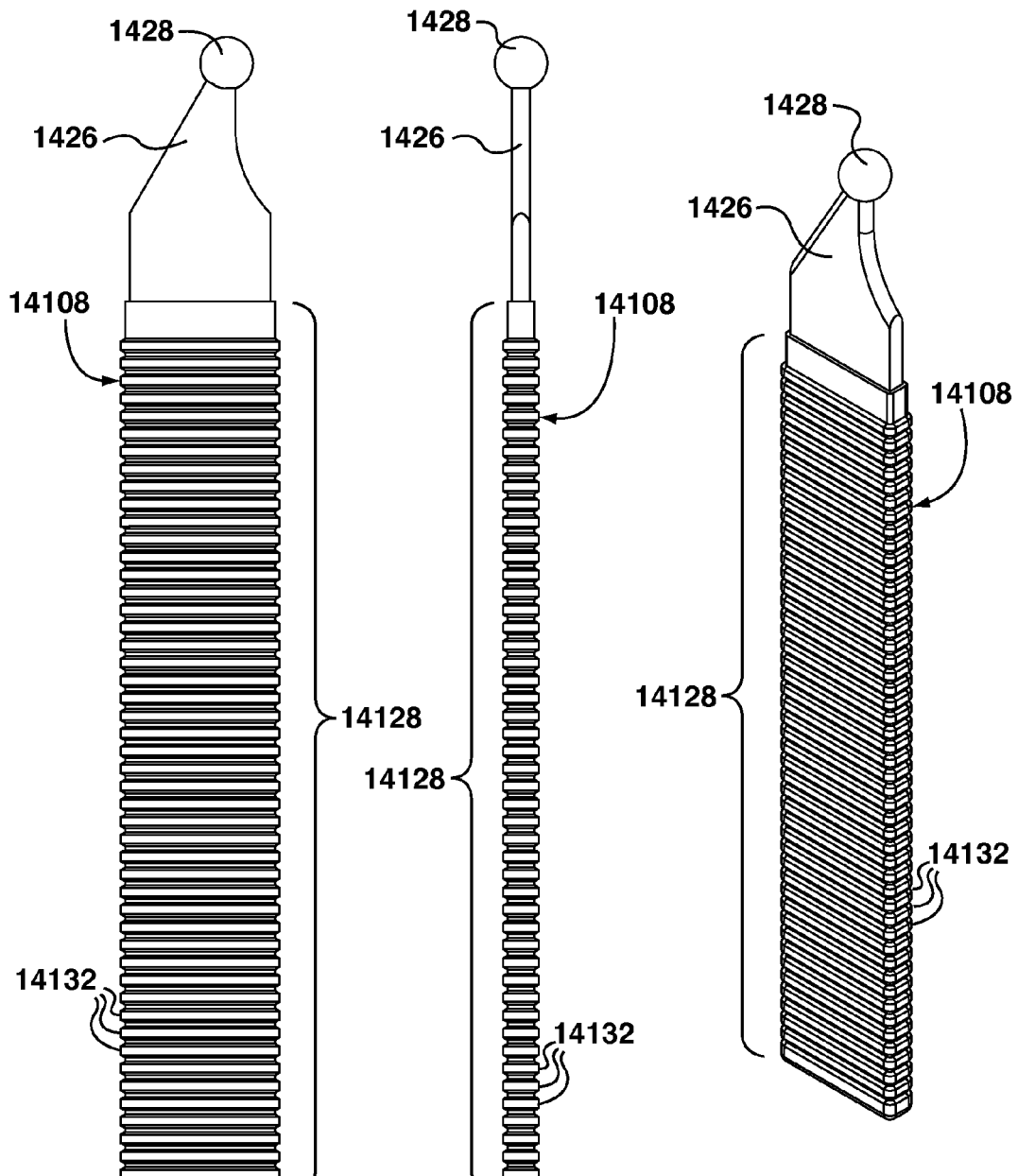

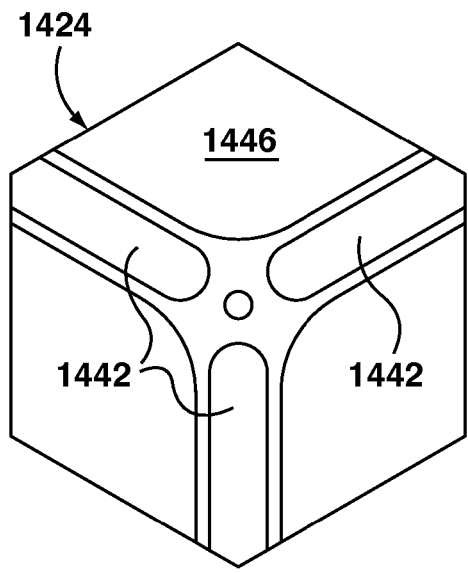 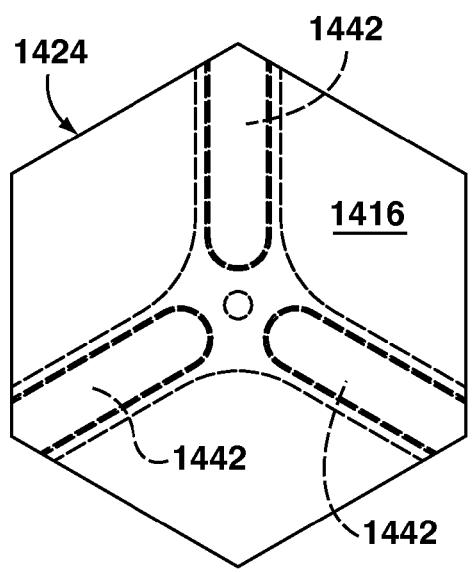
FIG. 14J  FIG. 14K
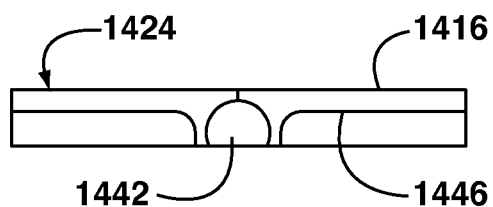
FIG. 14L

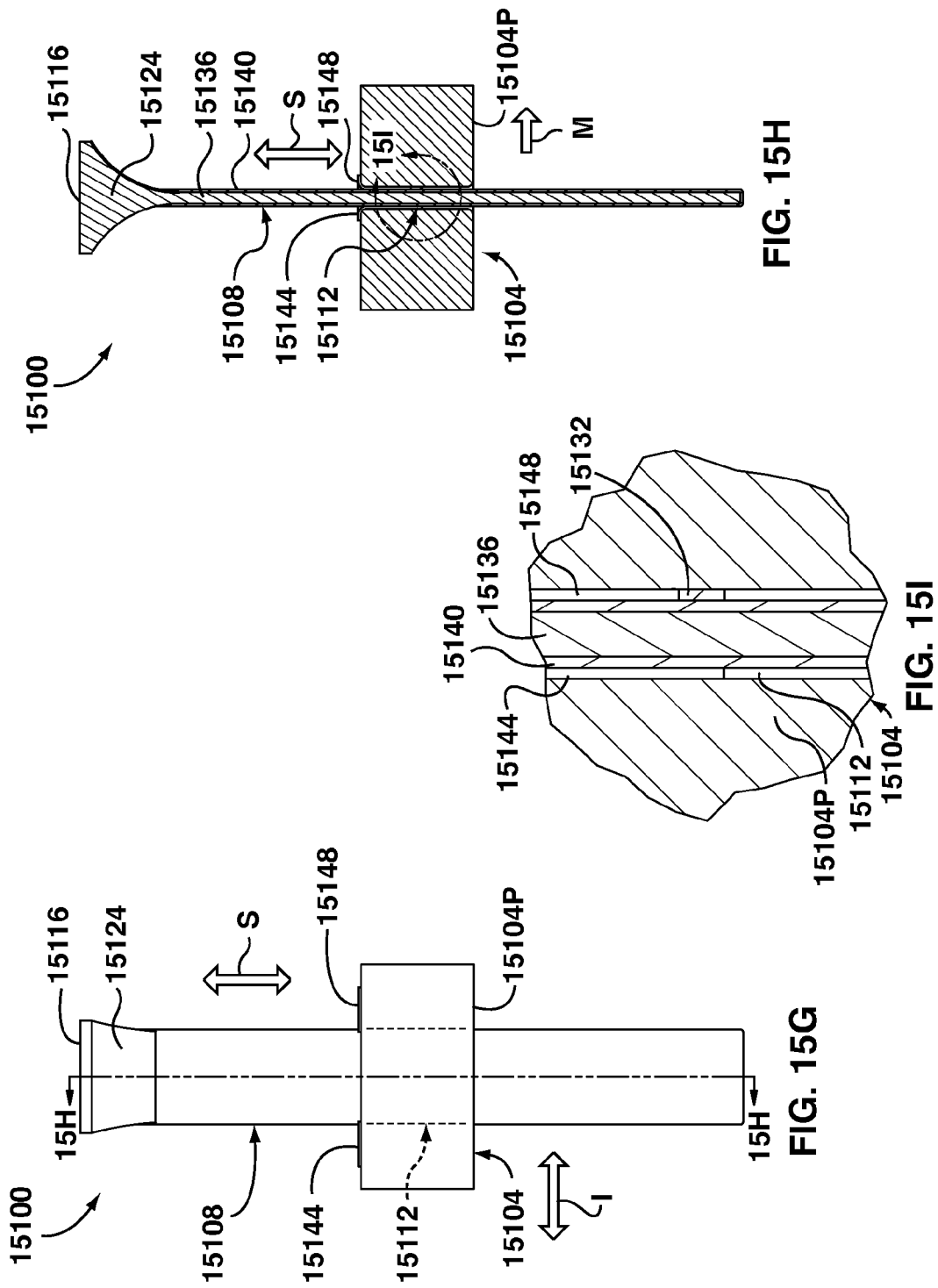

POLYMORPHIC SURFACE SYSTEMS AND METHODS

CROSS-REFERENCE TO RELATED APPLICATIONS

This application claims priority to U.S. Provisional Application No. 61/946,740 filed on Mar. 1, 2014 and to U.S. Provisional Application No. 62/041,632 filed on Aug. 25, 2014, the teachings of which are hereby incorporated by reference.

TECHNICAL FIELD

The present disclosure relates to polymorphic surface systems, that is, to systems having an adjustable surface which can assume a variety of shapes, and to related methods.

BACKGROUND

Computer imaging technology has advanced dramatically over the past several decades. Computers can now capture detailed three-dimensional image information, such as from laser scanning, medical imaging devices and many other sources, and can also generate three-dimensional image information. However, computers have conventionally been limited in their ability to present such three-dimensional data. Often such data is presented in two-dimensional form on a screen, where much of the richness of the data may be lost.

More recently, three-dimensional printing technology has enabled computers to generate real three-dimensional models that can be made the subject of not only visual but also tactile examination. While three-dimensional printing can provide considerable advantages, it necessarily consumes material and produces waste if the printed object is ultimately unwanted. Relying solely on three-dimensional printing to enable computers to express three-dimensional data is analogous to a computer which, for two-dimensional data, has a printer but no monitor.

SUMMARY

The present disclosure describes an electronically controllable polymorphic surface system, that is, a system with an adjustable physical surface which can dynamically assume a variety of transitory and/or persistent topographical shapes to represent three-dimensional information.

In one aspect, a polymorphic surface system comprises a guide structure having a plurality of individual cavities formed therein, and a plurality of surface contour elements. Each surface contour element is received in a respective one of the individual cavities for reciprocal substantially linear motion therein, and each of the surface contour elements has at least one electrically conductive path thereon. Each of the cavities has a magnetic field extending thereacross. Electrical contacts are associated with each cavity, and for each cavity, the electrical contacts comprise at least one first side electrical contact and at least one second side electrical contact. The first side electrical contact(s) are electrically isolated from the second side electrical contact(s) except for the electrically conductive path on the respective surface contour element in the cavity. The electrically conductive path(s) on the respective surface contour element in each cavity maintain electrical communication between the first side electrical contact(s) and the second side electrical contact(s) over a range of the reciprocal substantially linear motion of the respective surface contour element within the respective cavity. For each cavity, the first side electrical contact(s), the electrically conductive path(s) on the respective surface contour element in the cavity and the second side electrical contact(s) cooperate to form a circuit segment of an electrical circuit across the cavity. The electrical circuit includes a controller adapted to address the circuit segments to selectively apply current to, and remove current from, one or more selected circuit segments. Upon application of current to a selected circuit segment, the applied current interacts with the magnetic field across the respective cavity to generate a Lorentz force that drives substantially linear motion of the respective surface contour element within the respective cavity.

In a preferred embodiment, the magnetic field across each cavity is substantially perpendicular to the reciprocal substantially linear motion of the respective surface contour element within the respective cavity and current flowing through the circuit segment is substantially perpendicular to the magnetic field across the cavity and is also substantially perpendicular to the reciprocal substantially linear motion of the respective surface contour element within the respective cavity.

The controller may be adapted to selectively control a current applied to a selected one of the circuit segments. The controller may be adapted to detect a linear position of each surface contour element relative to its respective cavity, and may be further adapted to detect resistance to linear motion of individual ones of the surface contour elements by comparing an expected rate of linear motion to an actual rate of linear motion. The controller may be further adapted to detect induced current across each circuit segment, wherein the induced current is induced by movement of the surface contour element under external force.

In one embodiment, a single magnetic field extends across all of the cavities. In such an embodiment, the guide structure may comprise a magnetized ferromagnetic material to generate the single magnetic field. In another embodiment, a plurality of individual magnets are be arranged to provide each cavity with its own magnetic field. In one such embodiment, the individual magnets are internal to the surface contour elements. In another such embodiment, the individual magnets may be electromagnets.

In some embodiments, the cavities and the surface contour elements received therein are arranged in a regular grid.

Preferably, each surface contour element has a respective length, width and thickness, the length being measured parallel to the reciprocal substantially linear motion of the respective surface contour element, with the length of each surface contour element being substantially greater than its width and the width of each surface contour element being substantially greater than its thickness.

In some embodiments, each surface contour element has a head having a generally planar superior surface and the heads of the surface contour elements cooperate to form a polymorphic surface.

The surface contour elements may comprise a magnetic material.

The surface contour elements may be arranged in the cavities to move substantially in parallel with one another.

The polymorphic surface system may further comprise a resilient surface layer over the surface contour elements.

In some embodiments, the cavities are in valve-governed fluid communication with a fluid source for selectively introducing fluid into the cavities and sealing the fluid within the cavities to support the surface contour elements in the cavities after discontinuing the applied current, and withdrawing the fluid from the cavities to release the surface contour elements.

In a further aspect, a polymorphic surface system comprises a guide structure, a plurality of individual cavities formed in the guide structure and a plurality of surface contour elements. Each surface contour element is received in a respective one of the individual cavities for reciprocal substantially linear motion therein and each of the surface contour elements generates a respective magnetic field. Respective circuit segments of an electrical circuit extend across each cavity, and the electrical circuit includes a controller adapted to individually address the circuit segments to selectively apply current to, and remove current from, one or more selected circuit segments. Upon application of current to a selected one of the circuit segments, the applied current interacts with the respective magnetic field to generate a Lorentz force that drives substantially linear motion of the respective surface contour element within the respective cavity.

Preferably, the magnetic field generated by each surface contour element is substantially perpendicular to the reciprocal substantially linear motion of the respective surface contour element within the respective cavity and current flowing through the circuit segment is substantially perpendicular to the magnetic field and is also substantially perpendicular to the reciprocal substantially linear motion of the respective surface contour element within the respective cavity.

The individual magnets may be internal to the surface contour elements.

In another aspect, a method for dynamically forming a surface topography comprises applying at least one magnetic field across a plurality of movable surface contour elements and selectively passing a current through the at least one magnetic field adjacent selected ones of the surface contour elements, so that for each selected surface contour element, the current interacts with the magnetic field to generate a Lorentz force that drives guided substantially linear motion of the respective surface contour element. Preferably, the current is substantially perpendicular to the at least one magnetic field and the guided substantially linear motion of the respective selected surface contour element is perpendicular to both the at least one magnetic field thereacross and to the current. Preferably, the surface contour elements are individually moveable and individually selectable for application of current to generate movement.

The method may further comprise supporting the surface contour elements in position after removing the current.

The method may further comprise controlling a current passed through the at least one magnetic field adjacent each selected surface contour element to control an amount of guided substantially linear motion of that selected surface contour element.

The magnetic field may be a single magnetic field, and selectively passing a current through the at least one magnetic field adjacent selected individual ones of the surface contour elements may comprise selectively applying the current across the selected individual ones of the surface contour elements.

The magnetic field may be a plurality of individual magnetic fields, with each individual magnetic field being generated by a respective surface contour element, and selectively passing a current through the at least one magnetic field adjacent selected individual ones of the surface contour elements may comprise carrying a current past the selected individual ones of the surface contour elements.

BRIEF DESCRIPTION OF THE DRAWINGS

These and other features will become more apparent from the following description in which reference is made to the appended drawings wherein:

FIG. 14G is a first side elevation view of a surface contour element of the exemplary polymorphic surface system shown in FIG. 14A;

FIG. 14H is a second side elevation view of the surface contour element of FIG. 14G;

FIG. 14I is a top isometric view of the surface contour element of FIG. 14G;

FIG. 14J is a bottom plan view of a surface crown of the exemplary polymorphic surface system shown in FIG. 14A;

FIG. 14K is a top plan view of the surface crown of FIG. 14J;

FIG. 14L is a side elevation view of the surface crown of FIG. 14J;

FIG. 15G is a side elevation view showing a single surface contour element received within a cavity in a portion of a guide structure of the polymorphic surface system of FIG. 15A;

FIG. 15H is a cross-sectional view of the surface contour element and guide structure portion of FIG. 15G, taken along the line 15H-15H in FIG. 15G;

FIG. 15I is a detail view of a portion of FIG. 15H;

DETAILED DESCRIPTION

Figure 1A:
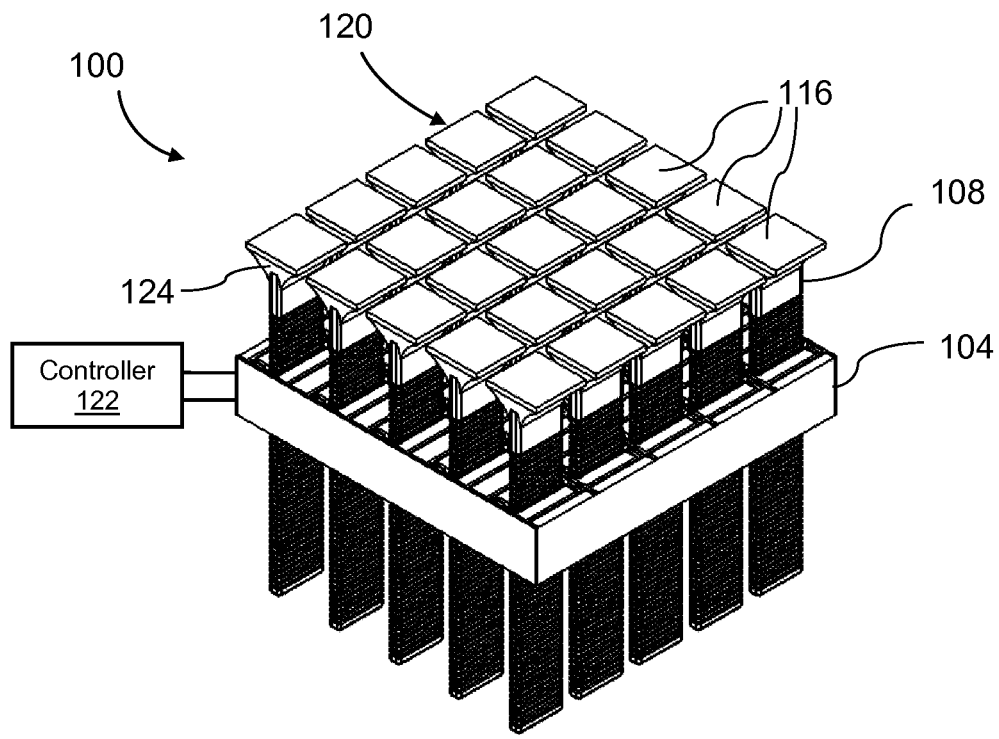
FIG. 1A is a top isometric view of a first exemplary polymorphic surface system with the polymorphic surface thereof arranged in a generally planar configuration.
Figure 1B:
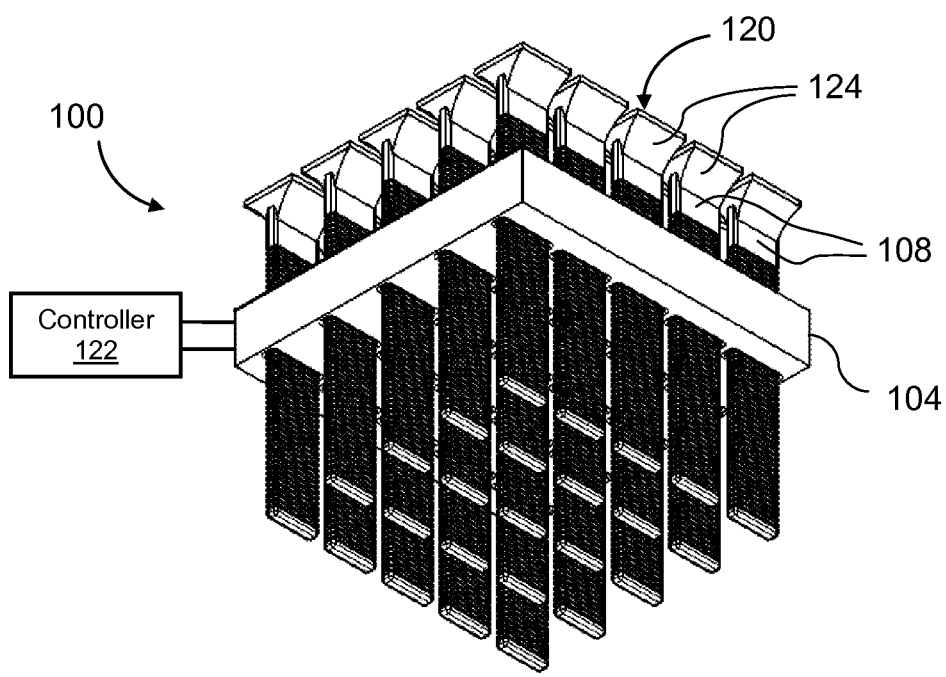
FIG. 1B is a bottom isometric view of the polymorphic surface system of FIG. 1A.
Figure 1C:
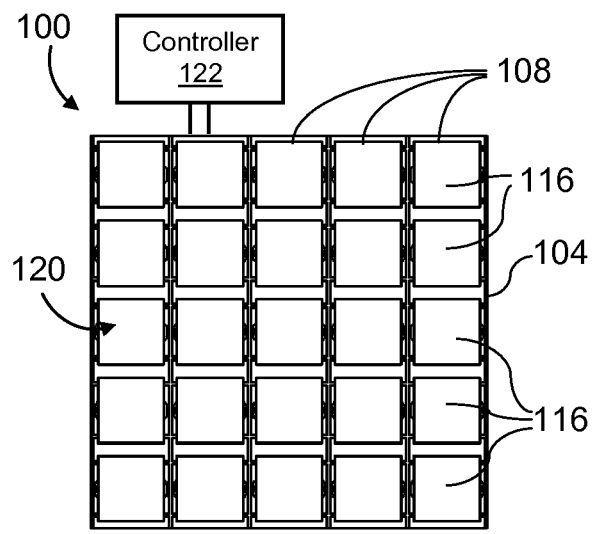
FIG. 1C is a top plan view of the polymorphic surface system of FIG. 1A.
Figure 1D:
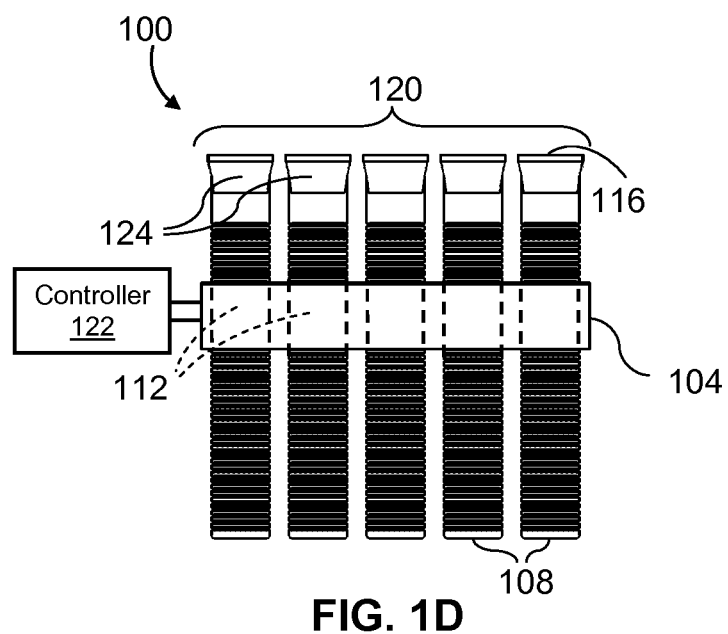
FIG. 1D is a first side elevation view of the polymorphic surface system of FIG. 1A.
Figure 1E:
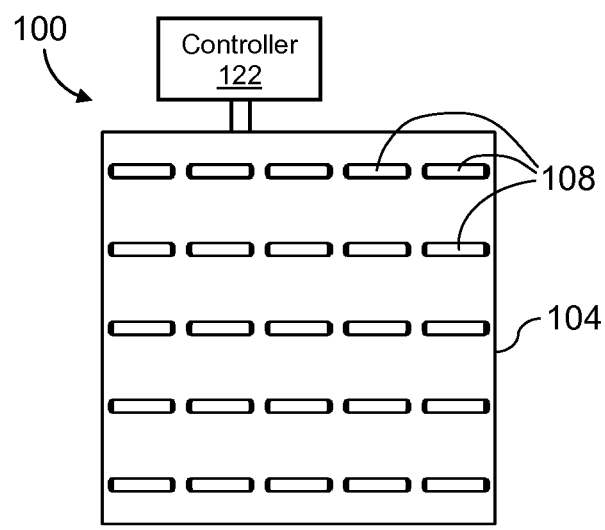
FIG. 1E is a bottom plan view of the polymorphic surface system of FIG. 1A.
Figure 1F:
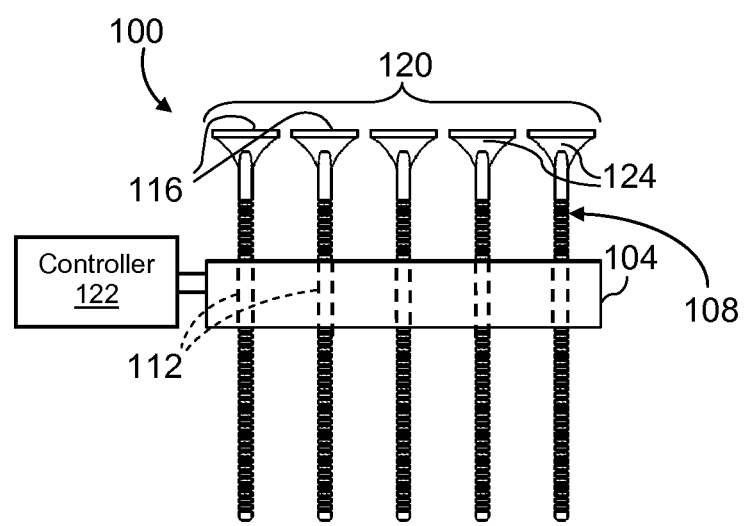
FIG. 1F is a second side elevation view of the polymorphic surface system of FIG. 1A.
Figure 1G:
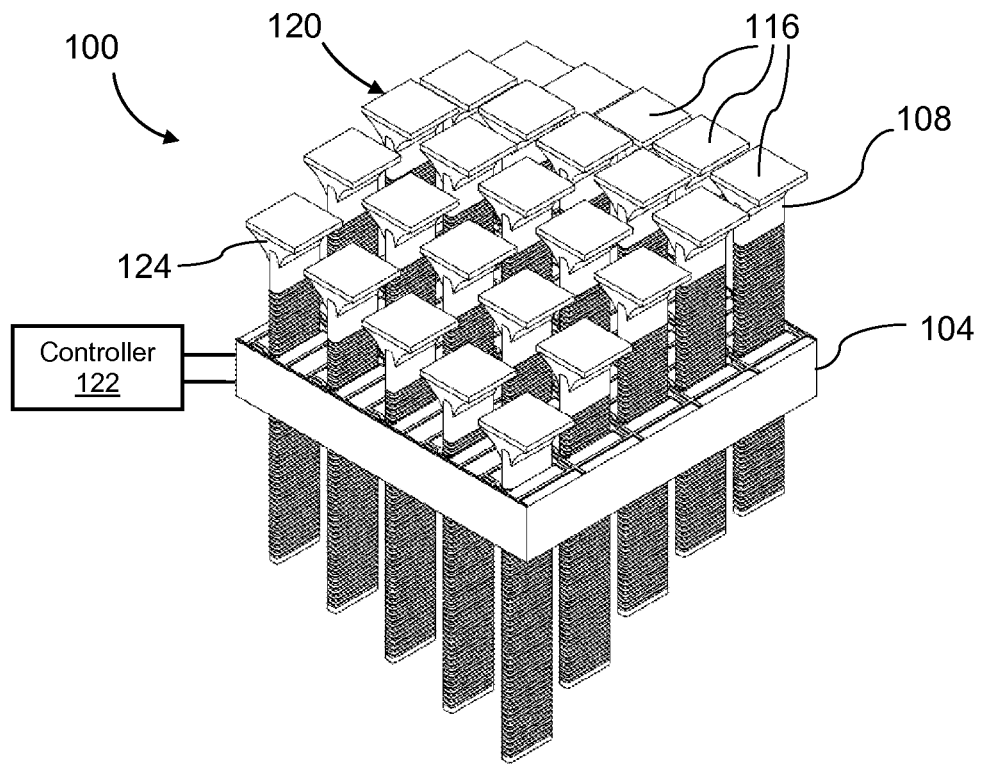
FIG. 1G is a top isometric view of the polymorphic surface system of FIG. 1A with the polymorphic surface thereof arranged in a non-planar configuration.
Figure 1H:
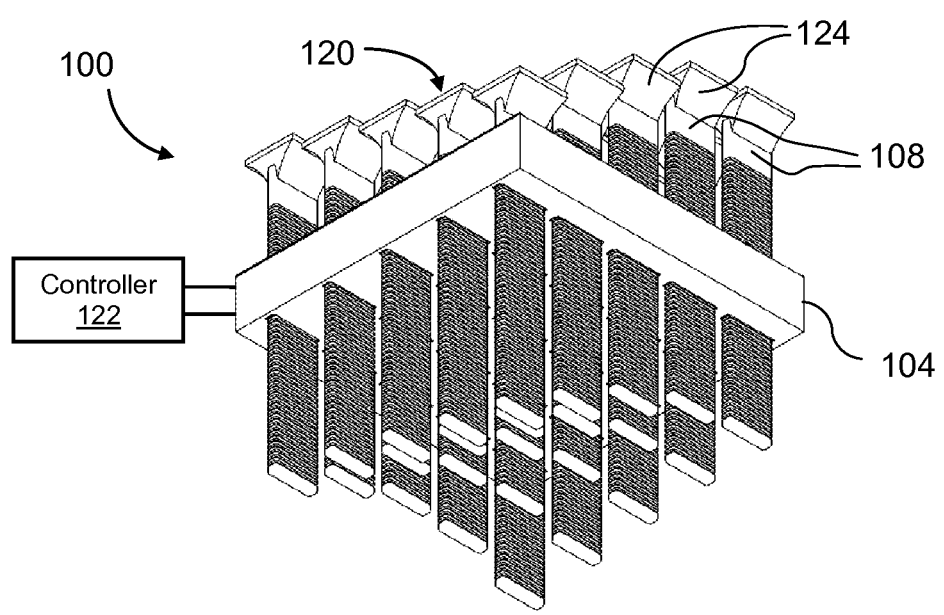
FIG. 1H is a bottom isometric view of the polymorphic surface system of FIG. 1A with the polymorphic surface thereof arranged in a non-planar configuration.

Reference is now made to FIGS. 1A to 1F, which show various views of an exemplary polymorphic surface system denoted generally by reference 100. The polymorphic surface system comprises a guide structure 104 and a plurality of individual surface contour elements 108. A plurality of individual cavities 112 (see FIGS. 4A and 4B) are formed in the guide structure 104. As can be seen in the Figures, in a preferred embodiment the cavities 112 extend entirely through the guide structure 104. Each surface contour element 108 is slidably received in a respective one of the individual cavities 112 for reciprocal sliding linear motion therein. In the exemplary embodiment, the superior surfaces 116 of the surface contour elements are generally square, and cooperate to form a polymorphic surface 120. By adjusting the linear position of the individual surface contour elements 108 within their respective cavities 112, the polymorphic surface 120 can be made to assume a variety of shapes, as shown in FIGS. 1G and 1H. The polymorphic surface system includes a controller 122, shown schematically in FIGS. 1A to 1F, which is adapted to control the mechanisms used to adjust the linear position of the individual surface contour elements 108 within their respective cavities 112. The controller 122 may be, for example, a suitably programmed computer or microcontroller or other suitable device. Mechanisms for adjusting the linear position of the individual surface contour elements 108 within their respective cavities 112 will be described in greater detail below.

In the illustrated embodiment, each surface contour element 108 has a head 124 that defines the generally planar superior surface 116 and thus the heads 124 of the surface contour elements 108 cooperate to form the polymorphic surface 120. In other embodiments, the heads of the surface contour elements and the superior surfaces formed thereby may have other suitable shapes besides being generally planar. Moreover, as described further below, in other embodiments the surface contour elements may omit any head and instead be movably coupled to surface crowns, with the surface crowns forming the polymorphic surface 120.

Reference is now made to FIGS. 2A to 2F, which show the exemplary surface contour elements 108 in more detail. Each of the surface contour elements 108 has at least one electrically conductive path 132 thereon. In the illustrated embodiment, the body portion 128 of each surface contour element 108, that is, the portion of the surface contour element 108 that slides within the cavity 112 (not shown in FIGS. 2A to 2F), has a series of longitudinally spaced-apart conductive paths 132 extending along the length L of the body portion 128. In the exemplary embodiment, the conductive paths 132 take the form of loops extending around the body portion 128 transversely to the length L thereof. Also in the exemplary embodiment, as shown in the cross-sectional views in FIGS. 2B and 2D, the body portion 128 of each surface contour element 108 is preferably formed from a magnetic or magnetizable core 136 surrounded by an insulating protective layer 140, with the conductive paths 132 disposed outwardly of the insulating protective layer 140. It is not necessary that the body portion 128 of each surface contour element 108 comprise a magnetic or magnetizable core. In other embodiments, the core of the body portion of the surface contour element may be formed from a non-magnetizable material. The choice between using a magnetizable or magnetic material, or a non-magnetizable material, for the core will depend on the relative distance of the surface contour element from the source of the magnetic field. Where the gradient of the magnetic field at the surface contour element is relatively small, the core is preferably formed from a magnetic or magnetizable material, and where the gradient of the magnetic field at the surface contour element is relatively large, the core is preferably formed from a non-magnetizable material. Where the core 136 is non-conductive, the protective layer 140 need not possess insulating properties.

Reference is now made to FIGS. 3A to 3D, which show the interrelationship between the guide structure 104 and the surface contour elements 108 with reference to a single surface contour element 108 and a portion 104P of the guide structure 104 comprising a single cavity 112 that slidingly receives the surface contour element 108.

Figure 3A:
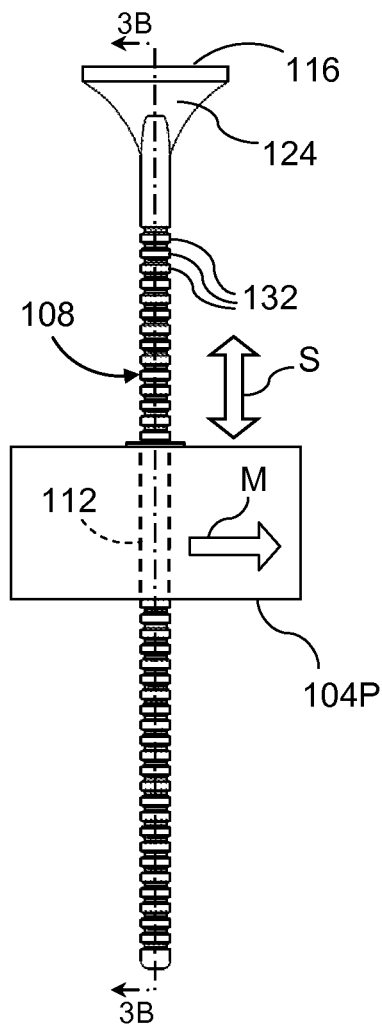
FIG. 3A is a side elevation view showing a single surface contour element received within a cavity in a portion of a guide structure of the polymorphic surface system of FIG. 1A.
Figure 3B:
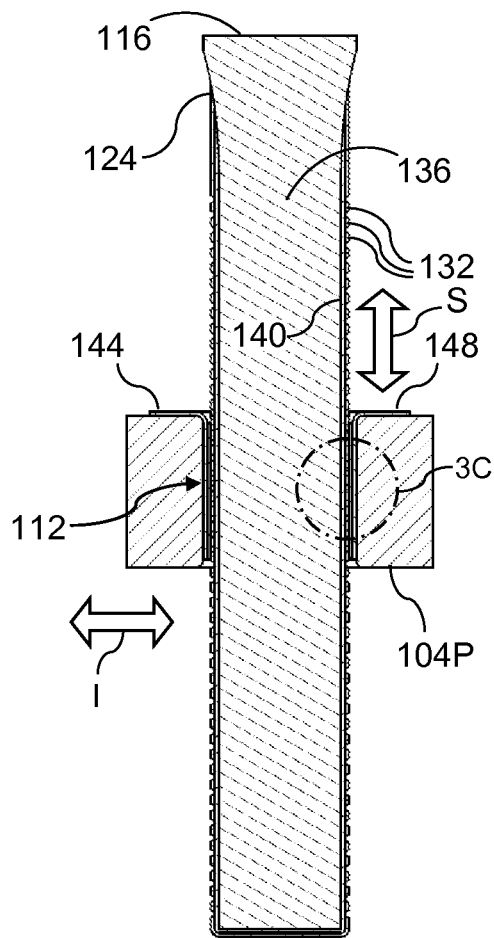
FIG. 3B is a cross-sectional view of the surface contour element and guide structure portion of FIG. 3A, taken along the line 3B-3B in FIG. 3A.

Each of the cavities 112 has a magnetic field extending thereacross. This magnetic field is denoted schematically by the arrow M in FIGS. 3A and 3D; the direction of the arrow M shows the direction of the magnetic field. As can be seen in FIGS. 3A and 3D, in the illustrated embodiment the magnetic field M across each cavity 112 is substantially perpendicular to the reciprocal sliding linear motion of the respective surface contour element 108 within the respective cavity 112. The direction of the reciprocal sliding linear motion of the respective surface contour element 108 is shown by the two-headed arrow S; the arrow S is two-headed because the motion is reciprocal. In the illustrated embodiment, a single magnetic field M extends across all of the cavities 112; to achieve this, the guide structure 104 comprises a magnetized ferromagnetic material to generate the single magnetic field M. The guide structure 104 is shown in isolation in FIGS. 4A and 4B, and in an exemplary embodiment may be formed by casting from a suitable ferromagnetic material. The cavities 112 may be formed as part of the casting process, or after casting, for example by drilling or laser cutting.

In alternate embodiments, each cavity may have its own magnetic field, and a plurality of individual magnets may be arranged to provide each cavity with its own magnetic field. In such an embodiment, the individual magnets may be internal to the surface contour elements or the individual magnets may be electromagnets, in which case the controller may be further adapted to vary the magnetic fields generated by each individual electromagnet. One example of such an embodiment is described further below in the context of FIG. 19.

Continuing to refer to FIGS. 3A to 3D, electrical contacts are disposed in each cavity 112. The electrical contacts comprise a first side electrical contact 144 and a second side electrical contact 148. For each cavity 112, each first side electrical contact 144 is electrically isolated from each second side electrical contact 148 except for the electrically conductive paths 132 on the respective surface contour element 108 in the cavity 112. The electrically conductive paths 132 on the surface contour element 108 in the cavity 112 maintain electrical communication between the first side electrical contact 144 and the second side electrical contact 148. The terms "side", "first side" and "second side", as used in this context, are used in the electrical rather than the physical sense and refer to the flow of current across the electrically conductive paths 132, which flow may be in either direction between the first side contact 144 and the second side contact 148—current flows from one contact ("side" of the circuit) to the other. Thus, although the exemplary conductive paths 132 are in the form of loops, the current will not loop around the conductive paths 132 back to the originating contact but will travel across the conductive paths 132 to the contact on the opposite "side". Moreover, although in the exemplary embodiment the first side electrical contacts 144 are positioned directly opposite the second side electrical contacts 148 across the respective cavities 112, there is no requirement that the first and second side electrical contacts have any particular relative physical position so long as they are electrically isolated from one another except for the electrically conductive path(s) on the respective surface contour element in the cavity. The use of the term "side" in its electrical sense should not be read as implying any such physical requirement. As such, it will be appreciated that in alternate embodiments, there may be a plurality of first side contacts and/or a plurality of second side electrical contacts, with current flowing across the electrically conductive paths 132 between the first side electrical contact(s) and the second side electrical contact(s).

Moreover, because the series of electrically conductive paths 132 extends along the length L (FIG. 2A) of the body portion 128, the electrically conductive paths 132 will maintain electrical communication between the first side electrical contact 144 and the second side electrical contact 148 over a range of the reciprocal sliding linear motion of the respective surface contour element 108 within the respective cavity 112.

Accordingly, the first side electrical contact 144, the electrically conductive paths 132 on the respective surface contour element 108 in the cavity 112 and the second side electrical contact 148 cooperate to form a circuit segment 152 of an electrical circuit across the cavity 112. As can be seen in FIG. 3D, in the illustrated embodiment the current flowing through the circuit segment 152, indicated by the arrow I, is substantially perpendicular to the magnetic field M across the cavity 112 and is also substantially perpendicular to the reciprocal sliding linear motion S of the respective surface contour element 108 within the respective cavity 112. In FIG. 3A the current I is perpendicular to the page and in FIG. 3B the magnetic field M is perpendicular to the page. When the current I flows through the circuit segment 152, the current I interacts with the magnetic field M across the cavity 112 to generate a Lorentz force that drives sliding linear motion S of the surface contour element 108 within the cavity 112. The direction of the current I will determine the direction of sliding linear motion S of the surface contour element 108; the current I is therefore denoted by a two-headed arrow.

Figure 3C:
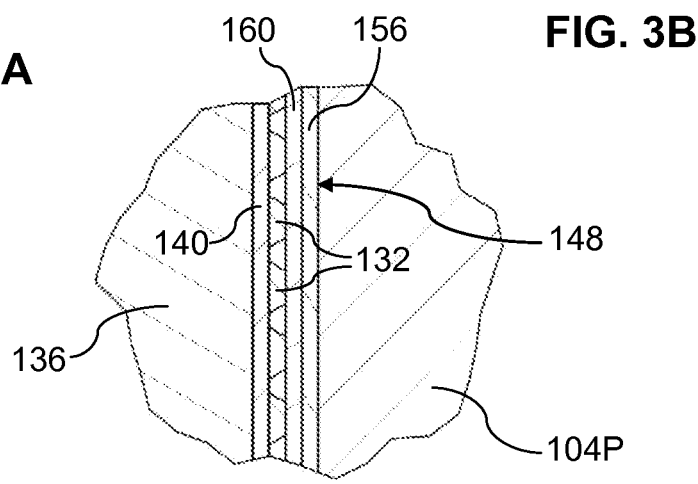
FIG. 3C is a detail view of a portion of FIG. 3B.
Figure 3D:
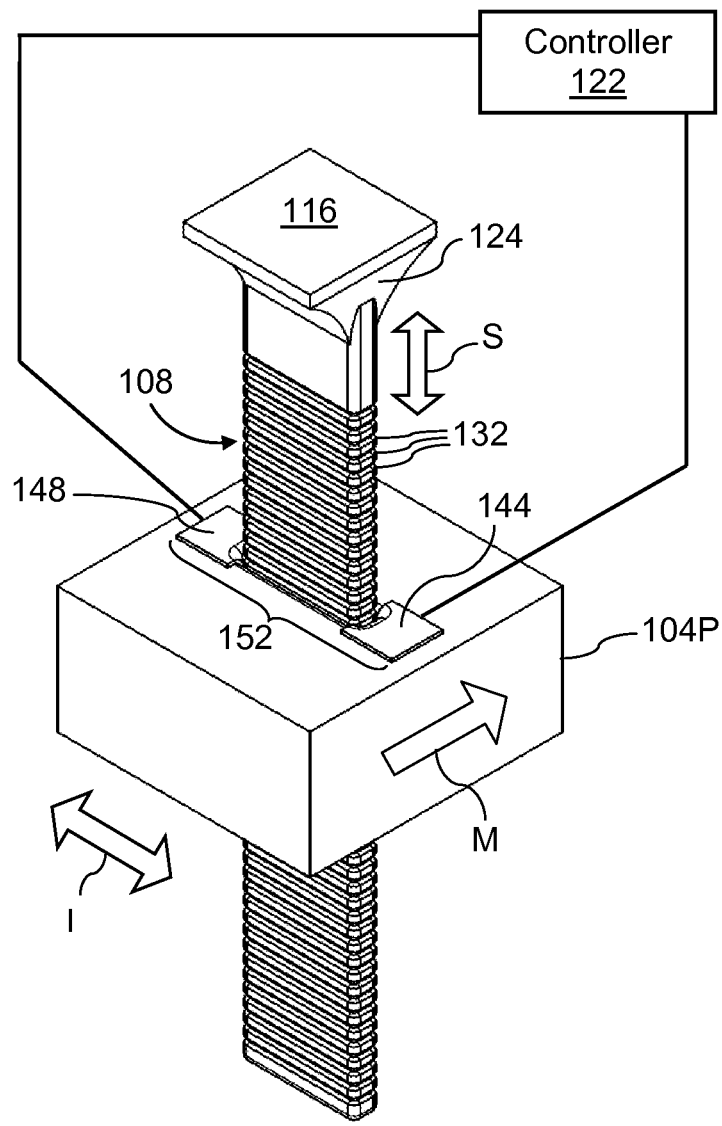
FIG. 3D is a top isometric view of the surface contour element and guide structure portion of FIG. 3A, schematically showing interconnection with a controller.

As seen in the detail view shown in FIG. 3C, in a presently preferred embodiment the electrical contacts 144, 148 (only representative second side electrical contact 148 is shown in FIG. 3C) comprise a base conducting layer 156 and a low friction conducting layer 160 that engages the conductive paths 132 to facilitate the sliding linear motion S of the surface contour element 108. The walls of the cavities 112 in the guide structure 104 may similarly be coated with a suitable low friction material.

Figures 2A, 2B:
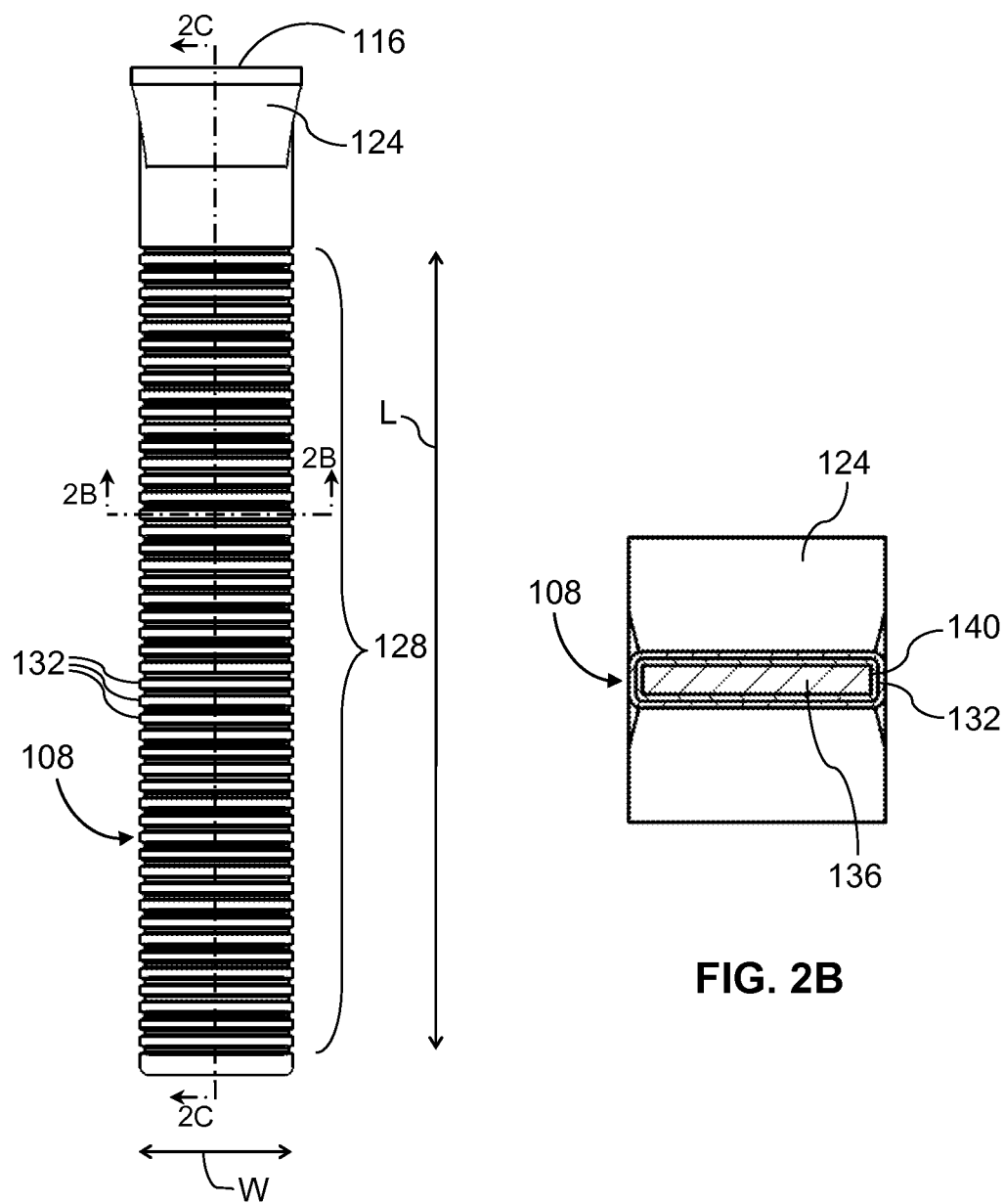
FIG. 2A is a side elevation view of an exemplary surface contour element of the polymorphic surface system of FIG. 1A.
FIG. 2B is a cross-sectional view of the surface contour element of FIG. 2A, taken along the line 2B-2B in FIG. 2A.
Figures 2C, 2D:
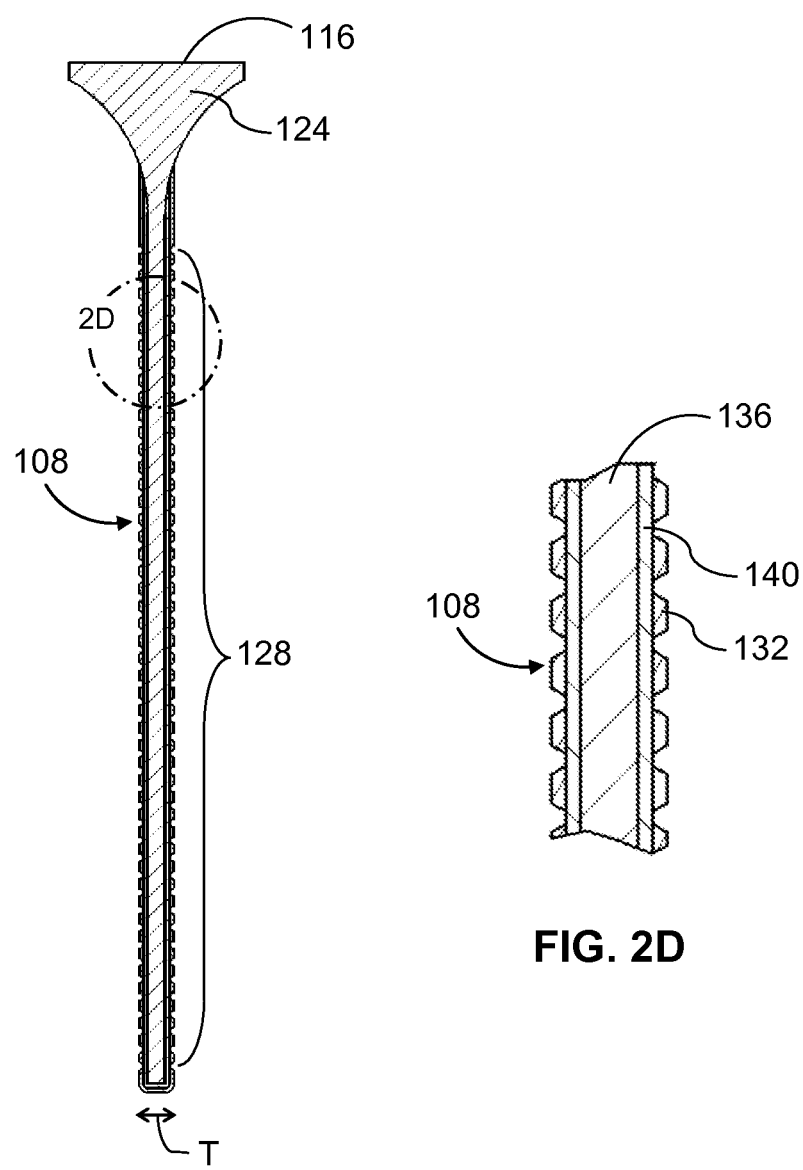
FIG. 2C is a cross-sectional view of the surface contour element of FIG. 2A, taken along the line 2C-2C in FIG. 2A.
FIG. 2D is a detail view of a portion of FIG. 2C.
Figures 2E, 2F:
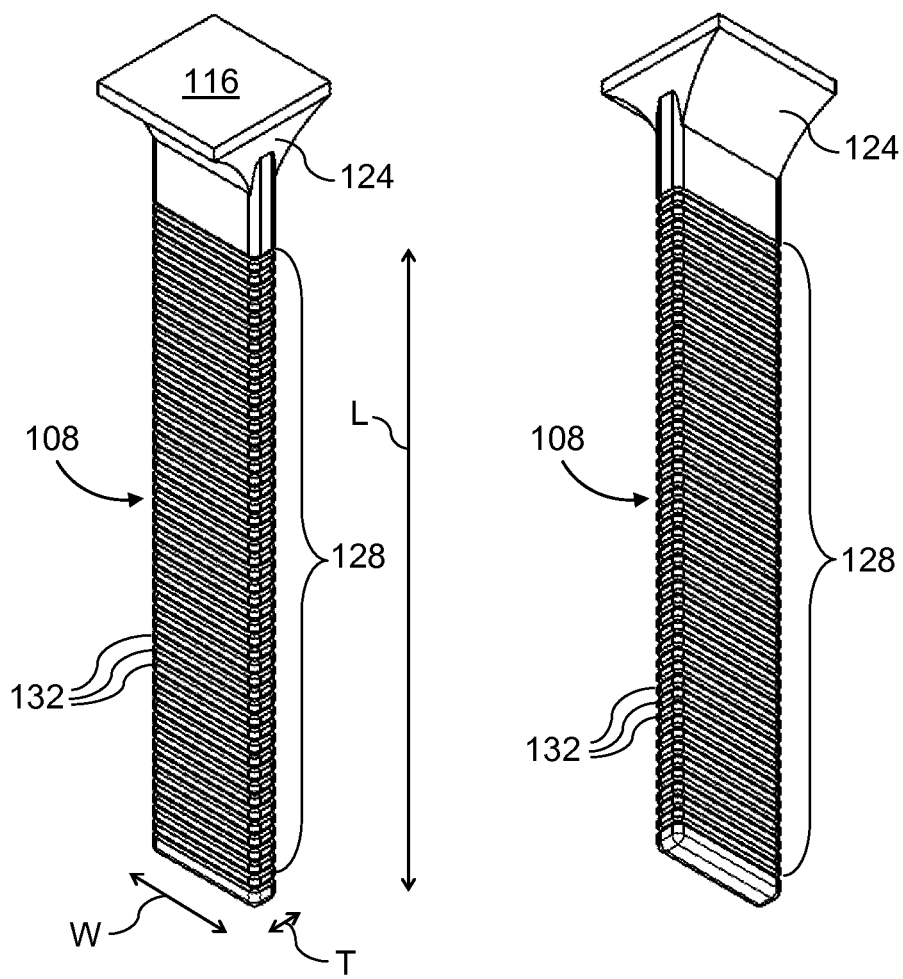
FIG. 2E is a top isometric view of the surface contour element of FIG. 2A.
FIG. 2F is a bottom isometric view of the surface contour element of FIG. 2A.

As best seen in FIG. 2E, each surface contour element 108 has a respective length L, width W and thickness T, with the length L being measured along the body portion 128, parallel to the reciprocal sliding linear motion S of the respective surface contour element 108. As can be seen, the length L of each surface contour element 108 is substantially greater than its width W and the width W of each surface contour element is substantially greater than its thickness T, and the cavities 112 (not shown in FIG. 2E) have a corresponding shape. The force applied to the surface contour element 108 is proportional to the length of the electrically conductive paths 132 between the first side electrical contact 144 and the second side electrical contact 148 (not shown in FIG. 2E), while the mass (and effect of gravity) is proportional to the volume of the surface contour element 108. Therefore, by making the thickness T of the surface contour element 108 smaller the same amount of force can be generated but with a smaller mass to be moved by that force. With reference now specifically to FIGS. 1C, 1D and 2B, it can be seen that in the illustrated embodiment, the body portions 128 of the surface contour elements 108 are small enough to fit within the cavities 112, while the superior surfaces 116 of the heads 124 are wide enough to cover the cavities 112. It is to be appreciated that the body portions of the surface contour elements are not limited to the cross-sectional shape shown in FIG. 2B, and may have any cross-sectional shape that can be received in a correspondingly shaped cavity for guided substantially linear movement.

In an exemplary manufacturing process, one or more body portions for surface contour elements may be formed from a sheet of metal. On each side of the metal sheet, an insulating protective oxide layer is deposited on the metal, then a uniform layer of conductive material is deposited over the insulating protective oxide layer, and then a layer of photoresist is deposited over the conductive material. A pattern of strips extending transversely to what will become the length of the body portion is then cured, resulting in a series of cured strips of photoresist separated by uncured strips of photoresist in a striped pattern. The uncured strips of photoresist are then removed, exposing the conductive material underneath, which is also removed, leaving the oxide layer with strips of conductive material on top and cured photoresist over top of the strips of conductive material. The cured photoresist is then removed, leaving a sheet of metal having, on each side, an insulating protective oxide layer over top of which is disposed a series of spaced apart strips of conductive material. The body portions can then be cut from the metal sheet, for example by laser, and the heads can then be secured to the body portions, resulting in completed surface contour elements in which the metal forms the core, the insulating protective oxide forms the insulating protective layer, and the spaced apart strips of conductive material form the conductive paths. In this embodiment, the conductive paths will be opposed strips on either side of the body portion rather than loops, but this will not affect operation of the system as long as the conductive paths engage the first side electrical contact and the second side electrical contact and the metal core is electrically isolated from the first side electrical contact and the second side electrical contact. Alternatively, the edges of the cut body portions can be pinched (i.e. flattened) to close the strips into loops and electrically isolate the metal core, or a suitable insulating coating may be applied to the cut edges of the strips.

As noted above, the polymorphic surface system 100 includes a controller 122 adapted to control the mechanisms used to adjust the linear position of the individual surface contour elements 108 within their respective cavities 112. The controller 122 is part of the electrical circuit that includes the circuit segments 152 that control movement of the respective surface contour elements 108, and the controller 122 is adapted to address the circuit segments 152 to selectively apply current to, and remove current from, one or more selected circuit segments 152. When the controller 122 applies a current I to a selected circuit segment 152, the applied current I interacts with the magnetic field M across the respective cavity 112 to generate a Lorentz force that drives sliding substantially linear motion S of the respective surface contour element 108 within the respective cavity 112. Each surface contour element 108 can be considered to be a resistor where the supplied current is proportional to the acceleration of the surface contour elements 108. The controller 122 can preferably individually address each circuit segment 152, and hence each surface contour element 108, so that it can control the position of each surface contour element 108 independently of the other surface contour elements 108. The controller 122 may control the current applied to each circuit segment 152 by controlling the magnitude of the current and/or the duration of the current. The electrical circuit comprising the controller 122 and the circuit segments 152 that control movement of the respective surface contour elements 108 may be, for example, an active matrix thin film transistor circuit, which enables the controller 122 to control movement of individual surface contour elements 108. Such a circuit is within the capability of one skilled in the art, now informed by the herein disclosure.

Figure 4A:
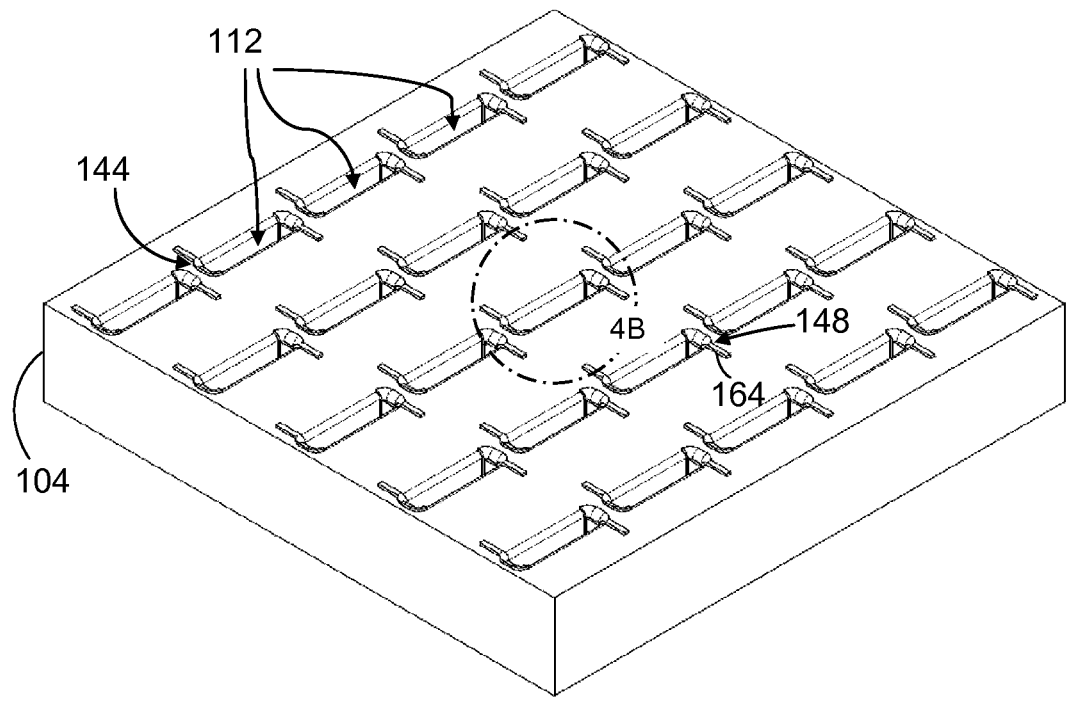
FIG. 4A is a top isometric view of the guide structure of the polymorphic surface system of FIG. 1A.
Figure 4B:
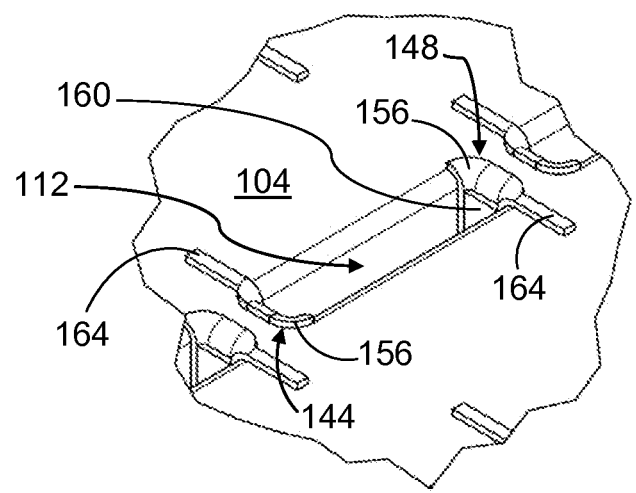
FIG. 4B is a detail view of a portion of FIG. 4A.
Figure 5A:
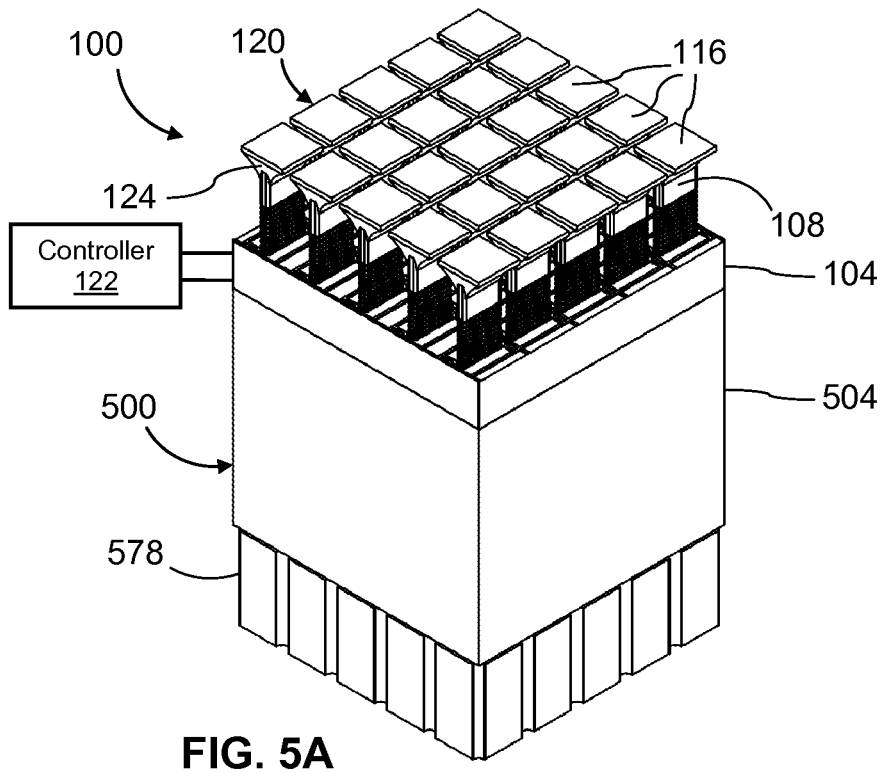
FIG. 5A is a top isometric view of the polymorphic surface system of FIG. 1A in combination with an exemplary hydraulic support system.
Figure 5B:
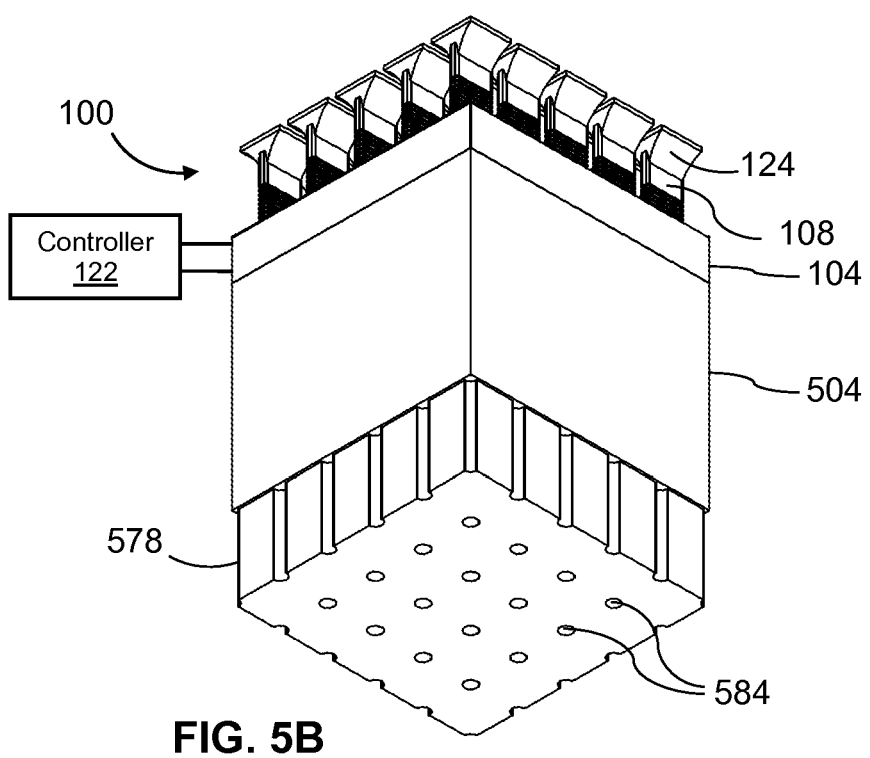
FIG. 5B is a bottom isometric view of the polymorphic surface system and hydraulic support system shown in FIG. 5A.
Figure 5C:
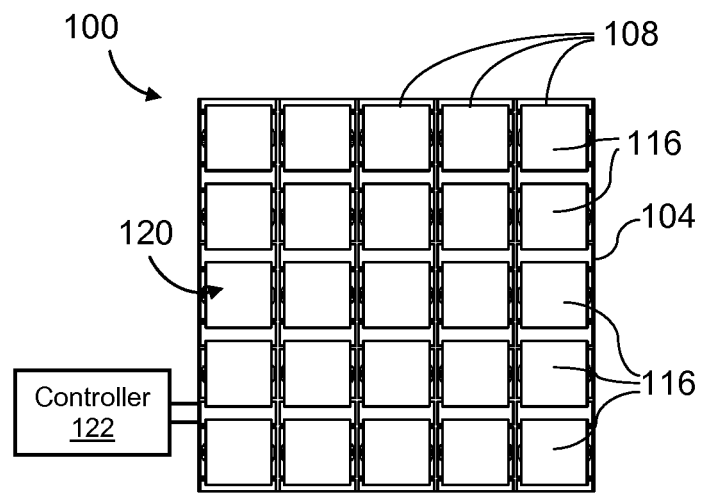
FIG. 5C is a top plan view of the polymorphic surface system and hydraulic support system shown in FIG. 5A.
Figure 5D:
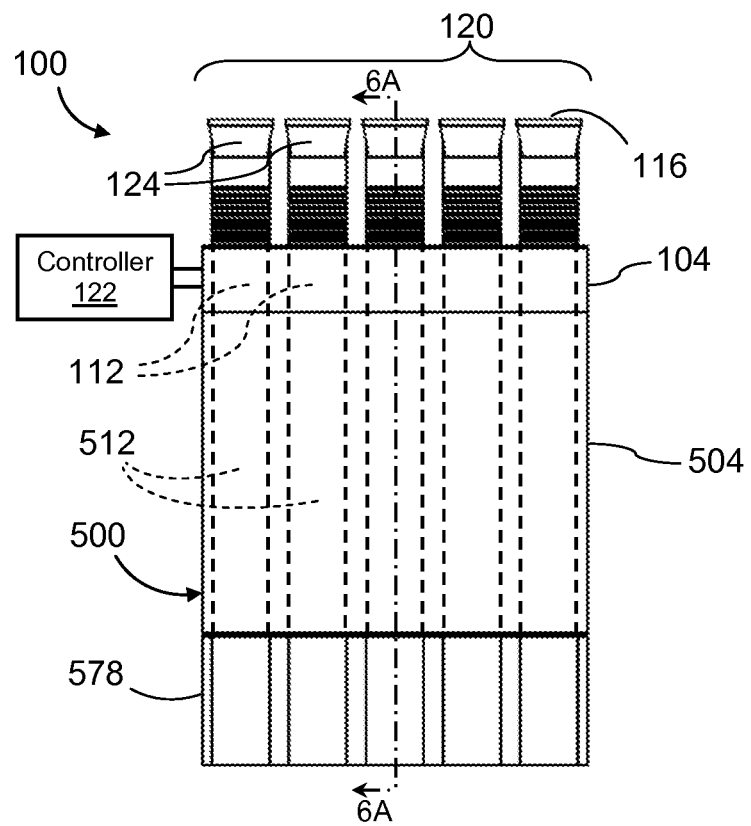
FIG. 5D is a first side elevation view of the polymorphic surface system and hydraulic support system shown in FIG. 5A.
Figure 5E:
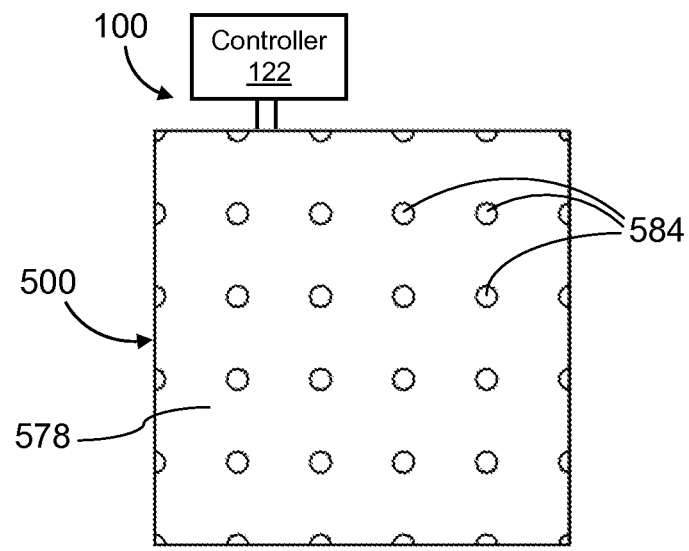
FIG. 5E is a bottom plan view of the polymorphic surface system and hydraulic support system shown in FIG. 5A.
Figure 5F:
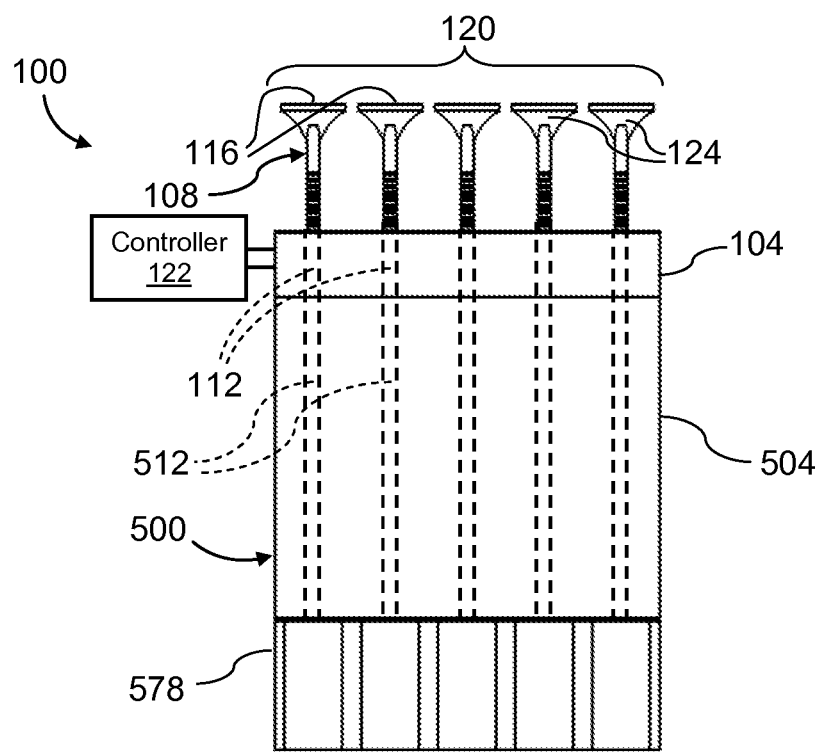
FIG. 5F is a second side elevation view of the polymorphic surface system and hydraulic support system shown in FIG. 5A.

As can be seen in the Figures, and particularly in FIGS. 1A, 1B, 4A and 4B, in the illustrated embodiment the cavities 112 and the surface contour elements 108 received therein are arranged in a regular rectangular grid, with the surface contour elements 108 arranged to move substantially in parallel with one another. The grid arrangement facilitates the use of an electrical circuit in which each circuit segment 152 (FIG. 3D) is individually addressable by the controller 122, and conductive traces 164 (FIGS. 4A and 4B) extending from the first side electrical contact 144 and the second side electrical contact 148 may be coupled to other elements of the electrical circuit. For simplicity of illustration, FIGS. 4A and 4B show the conductive traces 164 as stubs and omit other features of the electrical circuit.

It is not necessary that the cavities and surface contour elements be arranged in a rectangular grid, or that the surface contour elements be arranged to move substantially in parallel with one another. For example, the guide structure may take the form of a segment of a sphere, and the cavities and surface contour elements may be arranged for reciprocal radial movement of the surface contour elements toward and away from the center of the sphere.

The exemplary polymorphic surface system 100 shown in FIGS. 1A to 1H has twenty-five cavities 112 and twenty-five surface contour elements 108 arranged in a 5×5 matrix for simplicity of illustration; it is to be understood that polymorphic surface systems as taught herein are not so limited. Increasing the physical area occupied by the polymorphic surface will increase the extent of the surface topography that can be produced, and increasing the number of surface contour elements per unit area increases the resolution. In this sense, the surface contour elements may be considered a three-dimensional analog to pixels in a two-dimensional display. As such, the number of surface contour elements per unit area should be made as large as practically possible up to the limits of the required resolution in a given application. Therefore, much larger matrices than the exemplary 5×5 matrix are contemplated.

While in a preferred embodiment the controller 122 can individually address each circuit segment 152 to individually control each surface contour element 108, in other embodiments the controller 122 may address groups of circuit segments 152 to control groups of surface contour elements 108. For example, in a polymorphic surface system in which the cavities and surface contour elements are arranged in a 100×100 matrix, the controller may address groups of circuit segments for which the corresponding cavities and surface contour elements form a 2×2 array. In such an arrangement, the heads of the surface contour elements may be linked to one another, or a group of surface contour elements may share a common head.

Reference is now made to FIGS. 5A to 5F and FIGS. 6A to 6C, which show the first exemplary polymorphic surface system 100 in combination with an exemplary hydraulic support system 500. The hydraulic support system 500 comprises a support block 504 having a plurality of hydraulic support channels 512 defined therethrough. The hydraulic support channels 512 are in registration with the cavities 112 defined through the guide structure 104, and the support block 504 is preferably in sealing engagement with the guide structure 104. The hydraulic support channels 512 effectively extend the cavities 112, and the lower part of the body portion 128 of each surface contour element 108 is movably received in a respective hydraulic support channel 512. The lower end 170 of each surface contour element 108, that is, the end remote from the head 124, is fitted with a hydraulic plug 574 (see FIG. 6B) which slidably sealingly engages the interior surface of the respective hydraulic support channel 512. Each hydraulic support channel 512 terminates, at the end remote from the guide structure 104, in an inverted frusto-conical valve aperture 576 (see FIGS. 6A and 6C).

Figure 6A:
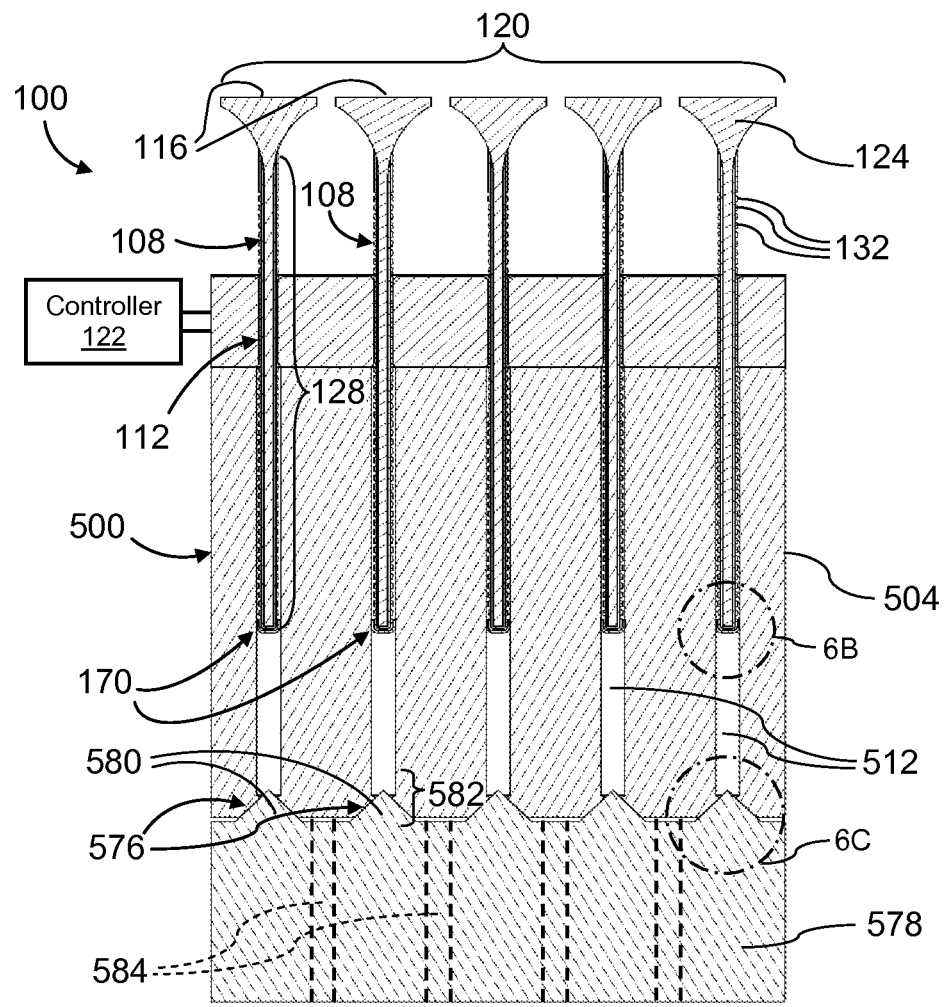
FIG. 6A is a cross-sectional view of the polymorphic surface system and hydraulic support system shown in FIG. 5A, taken along the line 6A-6A in FIG. 5D.
Figure 6B:
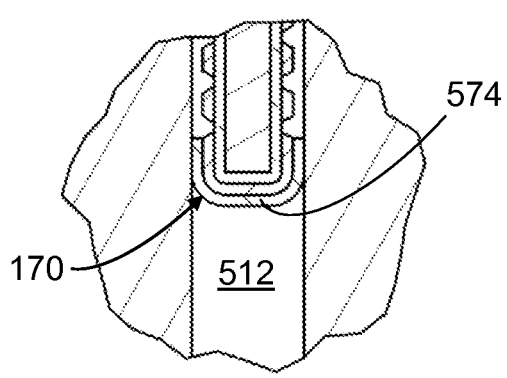
FIG. 6B is a detail view of a first portion of FIG. 6A.
Figure 6C:
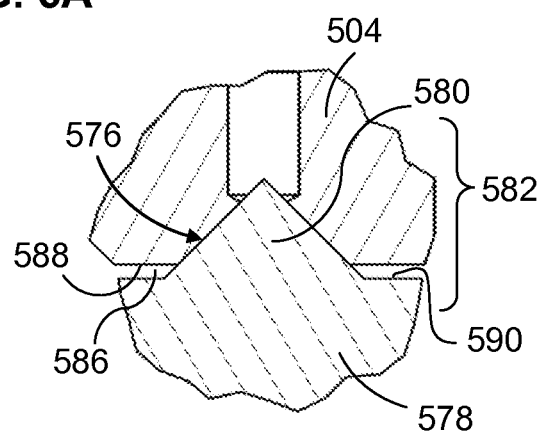
FIG. 6C is a detail view of a second portion of FIG. 6A.

Referring in particular to FIGS. 6A and 6C, a valving block 578 is movably positioned at the end of the support block 504 that is remote from the guide structure 104. The valving block 578 is coupled to an actuator (not shown) for moving the valving block 578 toward and away from the support block 504 to reduce and increase an adjustable volume 586 (FIG. 6C) between the valving block 578 and the support block 504. This adjustable volume 586 is sealed. For example, the support block 504 may be sealingly fixed in a fluid-tight housing (not shown) within which the valving block 578 is sealingly slidingly received so that the valving block 578 can slide toward and away from the support block 504 within the housing. In such an embodiment, the adjustable volume 586 will be defined by the face 588 (FIG. 6C) of the support block 504, the face 590 (FIG. 6C) of the valving block 578 and the wall(s) of the housing within which the valving block 578 slides. The valving block 578 carries a plurality of spaced apart conical valving members 580 arranged in registration with the frusto-conical valve apertures 576 on the support block 504. Each valving member 580 cooperates with a respective valve aperture 576 to form a respective cone valve 582. The cone valves 582 are in fluid communication with a constant pressure reservoir (not shown) via the adjustable volume 586 and fluid transfer conduits 584 defined through the valving block 578 and which communicate between the adjustable volume 586 and the constant pressure reservoir.

Moving the valving block 578 toward the support block 504 reduces the adjustable volume 586, forcing the fluid contained therein, which is under constant pressure, to move into the hydraulic support channels 512. When the valving block 578 engages the support block 504, the valving members 580 engage the valve apertures 576 to close the cone valves 582, trapping fluid in the hydraulic support channels 512 to support the surface contour elements 108 even in the absence of an applied current. Moving the valving block 578 away from the support block 504 opens the cone valves 582, allowing fluid to escape from the hydraulic support channels 512 via the open cone valves 582 to the adjustable volume 586 so as to release the surface contour elements 108 to move freely. Thus, the cavities 112, as extended by the hydraulic support channels 512, are in valve-governed fluid communication with a fluid source for selectively (a) introducing fluid into the cavities 112/512 and sealing the fluid within the cavities 112/512 to support the surface contour elements 108 in the cavities 112/512 after discontinuing the applied current, and (b) withdrawing the fluid from the cavities 112/512 to release the surface contour elements 108.

In reference to the terms "support block" and "valving block", it is to be understood that the word "block" is not intended to imply that these components must be of monolithic construction, although monolithic construction is one preferred embodiment.

Figure 10:
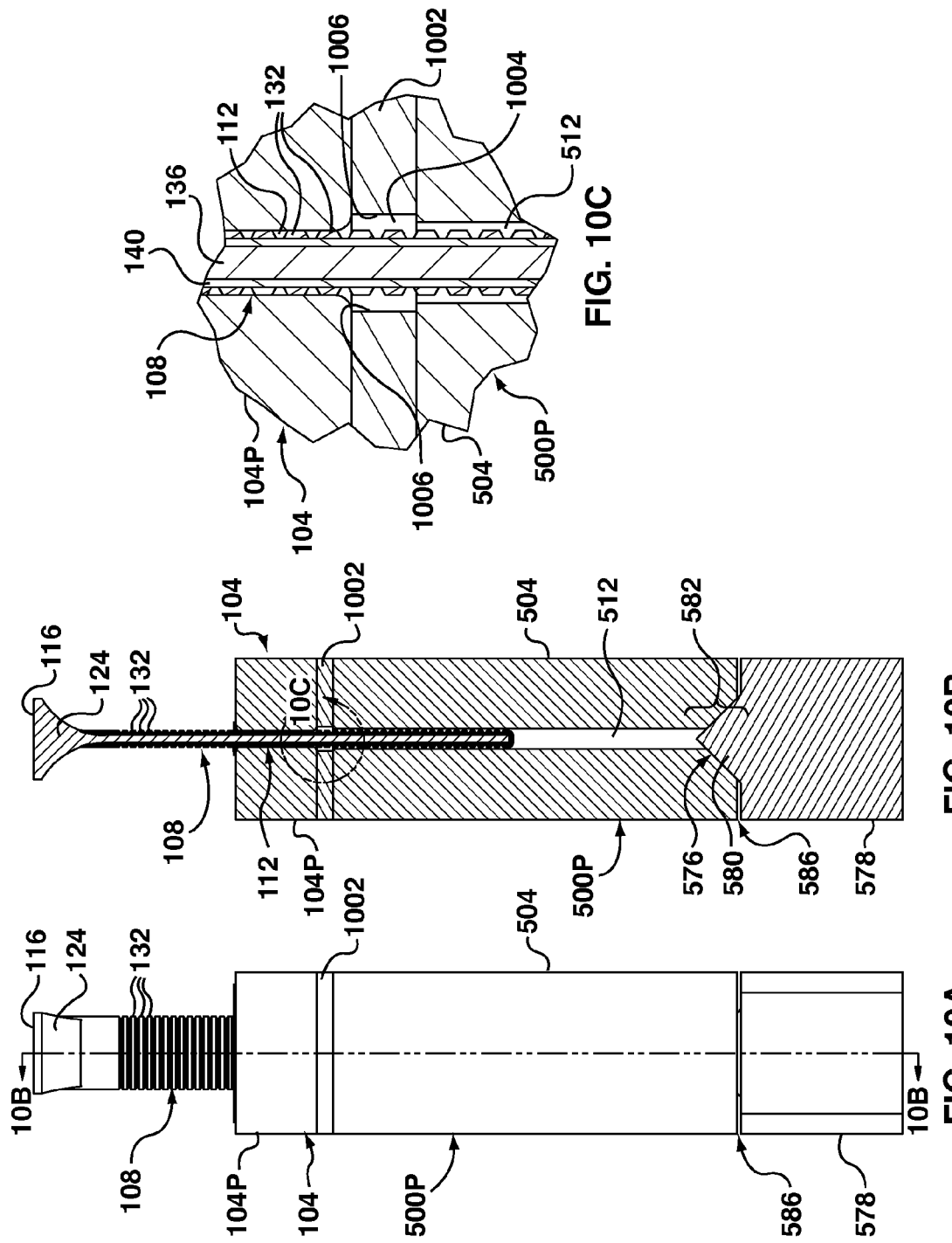
FIG. 10A is a side elevation view showing a portion of the polymorphic surface system of FIG. 1A in combination with a portion of the hydraulic support system of FIG. 5A and in further combination with a portion of an exemplary secondary support system, showing a single surface contour element with the secondary support system in an unlocked configuration.
FIG. 10B is a cross-sectional view of the surface contour element, guide structure portion, hydraulic support system portion and secondary support system portion of FIG. 10A, taken along the line 10B-10B in FIG. 10A and showing the secondary support system in an unlocked configuration.
FIG. 10C is a detail view of a portion of FIG. 10B.
Figure 11:
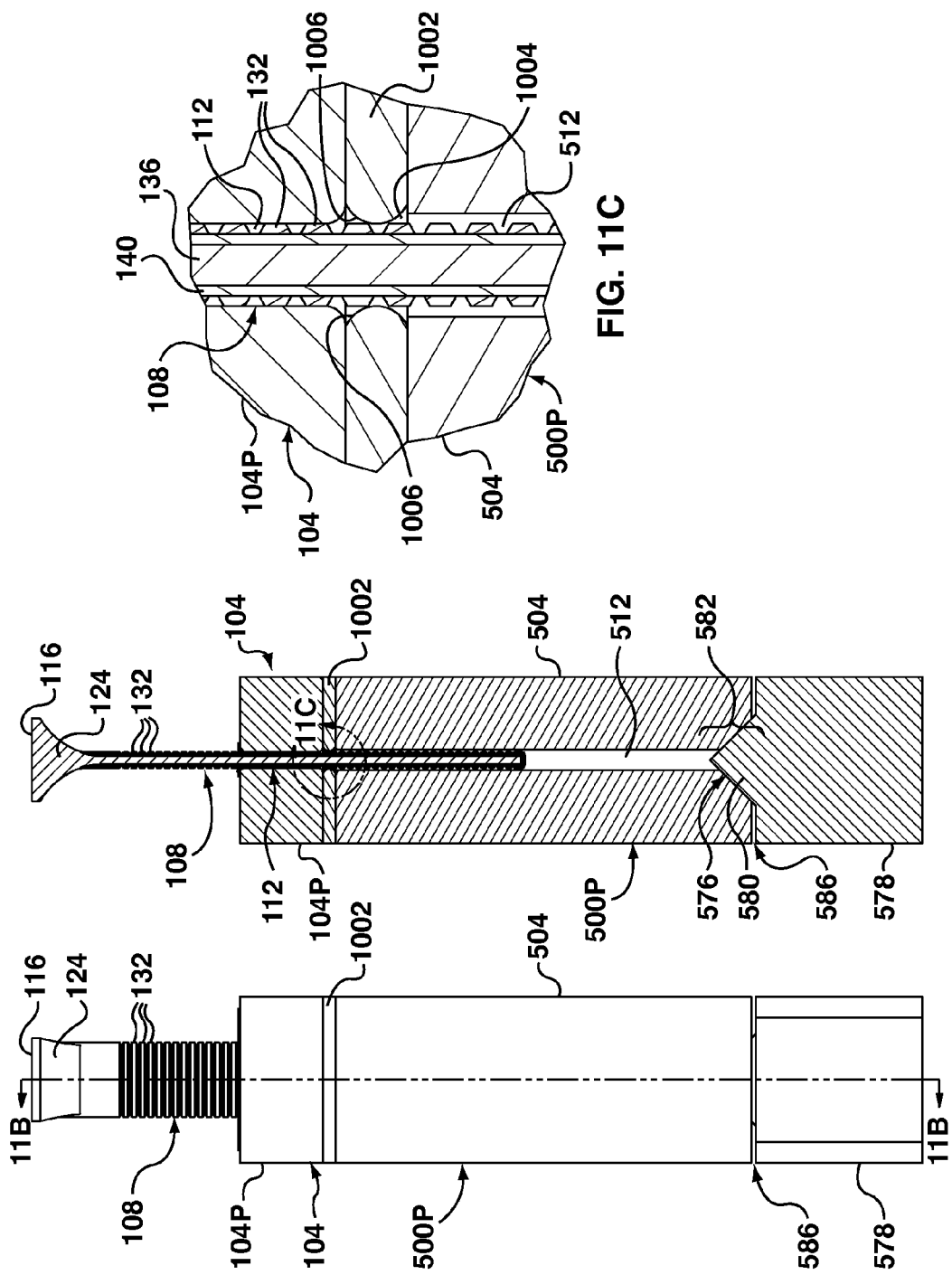
FIG. 11A is a side elevation view of the surface contour element, guide structure portion, hydraulic support system portion and secondary support system portion of FIG. 10A, showing the secondary support system in a locked configuration.
FIG. 11B is a cross-sectional view of the surface contour element, guide structure portion, hydraulic support system portion and secondary support system portion of FIG. 10A, taken along the line 11B-11B in FIG. 11A and showing the secondary support system in a locked configuration.
FIG. 11C is a detail view of a portion of FIG. 11B.

Optionally, polymorphic surface systems may be provided with a secondary support system, in addition to the hydraulic support system 500. One exemplary implementation of such a secondary support system will now be described with reference to FIGS. 10A to 10C and 11A to 11C, which show an exemplary surface contour element 108 in association with its respective portions 500P, 104P of the hydraulic support system 500 and the guide structure 104. FIGS. 10A to 10C show the secondary support system in an unlocked configuration and FIGS. 11A to 11C show the secondary support system in a locked configuration. For simplicity of illustration, the base conducting layer, low friction conducting layer and electrical contacts of the portion 104P of the guide structure are not shown in FIGS. 10A to 10C and 11A to 11C.

The exemplary secondary support system shown in FIGS. 10A to 10C and 11A to 11C comprises a resilient elastomeric membrane 1002 interposed between the support block 504 and the guide structure 104. The elastomeric membrane 1002 has a plurality of locking apertures 1004 (see FIGS. 10C and 11C) defined therethrough, with the apertures 1004 arranged in registration with the respective surface contour elements 108, cavities 112 and hydraulic support channels 512. As such, the body portion 128 of the surface contour elements 108 extend through the locking apertures 1004. For ease of illustration, FIGS. 10A to 10C and 11A to 11C show only a portion of the elastomeric membrane 1002, and only a single locking aperture 1004, surface contour element 108, cavity 112 and hydraulic support channel 512.

The support block 504 and the guide structure 104 are relatively movable toward and away from one another, and a suitable actuator (not shown) may be provided to effect such movement. When the secondary support system is in the unlocked configuration, as shown in FIGS. 10A to 10C, the elastomeric membrane 1002 is relatively uncompressed and the interior surfaces 1006 of the locking apertures 1004 are spaced from the surface contour element 108 (see FIG. 10C), permitting the surface contour element 108 to move freely along the cavity 112 and hydraulic support channel 512. When the support block 504 and the guide structure 104 are moved toward one another, the elastomeric membrane 1002 is compressed (relative to the condition shown in FIG. 10C) and undergoes elastomeric deformation, causing the interior surfaces 1006 of the locking apertures 1004 to bulge inwardly and engage the body portion 128 of the surface contour element 108 (see FIG. 11C). This is the locked configuration (FIGS. 11A to 11C), in which the deformed elastomeric membrane 1002 grips the body portion 128 of the surface contour element 108 and exerts frictional force thereon, thereby locking the surface contour element 108 in place as long as the elastomeric membrane 1002 is compressed. Moving the support block 504 and the guide structure 104 away from one another returns the secondary support system to the unlocked configuration, as shown in FIGS. 10A to 10C, allowing the elastomeric membrane 1002 resile to its uncompressed shape and freeing the surface contour element 108 to move along the cavity 112 and hydraulic support channel 512.

The exemplary secondary support system may be used to fix the surface contour elements 108 in place while the valving block 578 is moved toward the support block 504 to provide hydraulic support, and may also inhibit leakage.

The present disclosure also contemplates alternative structures for a polymorphic surface which rely on individual hydraulic control of the surface contour elements rather than electrical control thereof, and a hydraulic support structure similar to the hydraulic support structure 500 described above may be adapted to this purpose, for example by using individually controllable valves to govern fluid communication between an adjustable volume and the hydraulic support channels for the surface contour elements.

Figure 13:
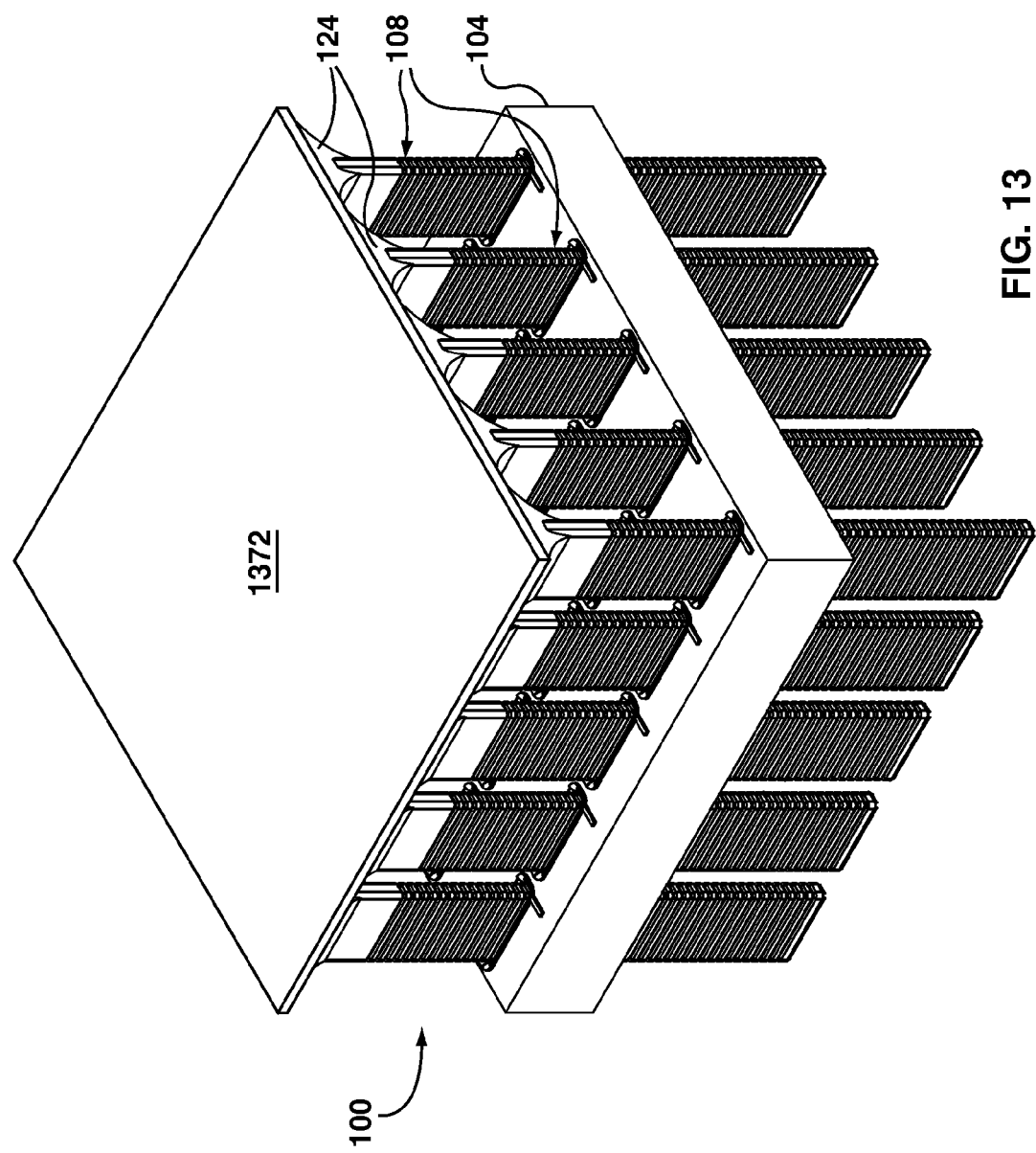
FIG. 13 shows the exemplary polymorphic surface system of FIG. 1A with a resilient surface layer extending over the surface contour elements thereof.

Polymorphic surface systems as described herein, and particularly polymorphic surface systems coupled to a hydraulic support system, may be adapted for use in molding operations. The controller may direct movement of the surface contour elements so that the polymorphic surface assumes a desired surface topography, and the polymorphic surface can then serve as all or part of a mold cavity. To facilitate this process and inhibit leakage of the material being molded between the surface contour elements, the polymorphic surface may further comprise a resilient surface layer, formed from a suitable resilient and pliable material impermeable to the material being molded, extending over the surface contour elements. The surface layer may be secured to the surface contour elements. FIG. 13 shows the exemplary polymorphic surface system 100 with a resilient surface layer 1372 extending over the surface contour elements 108 and secured to the heads 124 thereof. When polymorphic surface systems as described herein are used in molding applications, the heads of the surface contour elements are preferably formed from an insulating material or are provided with an insulating layer or cap to limit heat transfer to the surface contour elements, in particular the body portions thereof, and thereby inhibit demagnetization and other damage.

Polymorphic surface systems as described herein can be further adapted to molding applications by providing "hollow" surface contour elements, that is, surface contour elements having respective lumens defined therethrough for the delivery of material into the mold cavity. In effect, the polymorphic surface system may be an array of surface contour elements configured to function as injection elements. It is not necessary for all of the surface contour elements to have lumens defined therethough; in some embodiments only a subset of the surface contour elements may have lumens.

Figure 12:
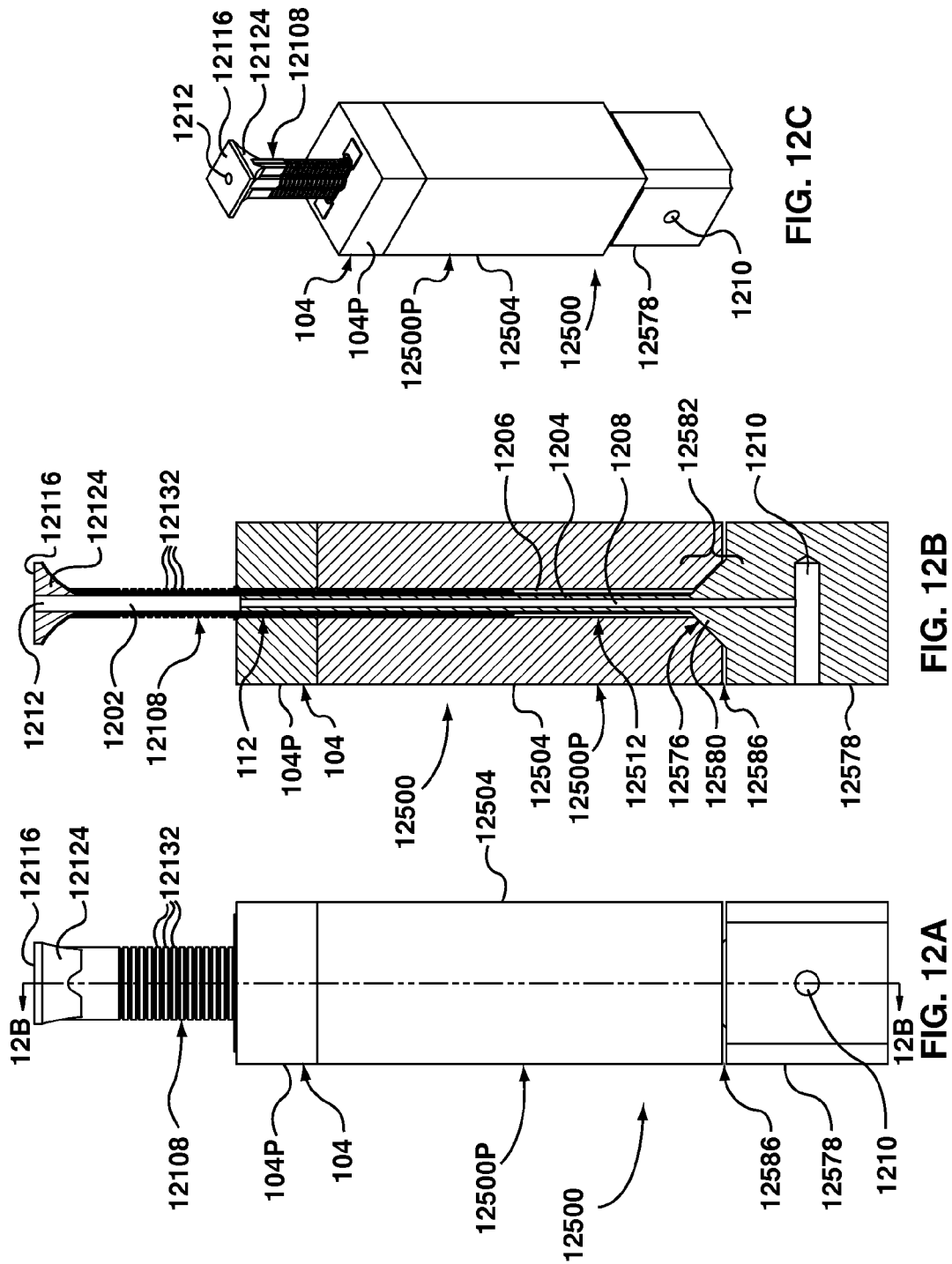
FIG. 12A is a side elevation view showing a portion of a second exemplary polymorphic surface system in combination with a portion of a second exemplary hydraulic support system incorporating an exemplary injection system, showing a portion of the guide structure and a single surface contour element integrated with the injection system.
FIG. 12B is a cross-sectional view of the surface contour element, guide structure portion and hydraulic support system portion of FIG. 12A, taken along the line 12B-12B in FIG. 12A.
FIG. 12C is a top isometric view of a portion of the surface contour element, guide structure portion and hydraulic support system portion of FIG. 12A.

Reference is now made to FIGS. 12A though 12C, which show the arrangement of a second exemplary surface contour element 12108 in association with its respective portions 12500P, 104P of a second exemplary hydraulic support system 12500 and a guide structure 104. The guide structure 104 shown in FIGS. 12A though 12C is identical to the guide structure 104 described above and hence is denoted by the same reference numeral.

The second exemplary surface contour element 12108 shown in FIGS. 12A through 12C is similar to the first exemplary surface contour element 108 described above, with like reference numerals used to denote like features except with the additional prefix "12". The second exemplary surface contour element 12108 shown in FIGS. 12A though 12C differs from the first exemplary surface contour element 108 in that it is adapted to function as an injection element. A cylindrical lumen 1202 (FIG. 12B) extends longitudinally through the surface contour element 12108, and the surface contour element 12108 does not include a hydraulic plug, or includes an annular hydraulic plug, leaving the lumen 1202 unobstructed. In other embodiments, the lumen may have other suitable shapes besides cylindrical.

The second exemplary hydraulic support system 12500 is also similar to the first exemplary hydraulic support system 500, with like reference numerals denoting like features but with the additional prefix "12". The second exemplary hydraulic support system 12500 differs from the first exemplary hydraulic support system 500 in that it has been modified to accommodate an injection system.

A needle-like injector 1204 (FIG. 12B) extends from each of the conical valving members 12580 of the second exemplary hydraulic support system 12500. The injector 1204 is arranged coaxially with the conical valving member 12580 and extends superiorly thereof through the respective valve aperture 12576 and hydraulic support channel 12512 into the lumen 1202 of the surface contour element 12108. The injector 1204 is sized and shaped to be sealingly slidingly received within the lumen 1202 of the surface contour element 12108, and is therefore necessarily smaller in diameter than the hydraulic support channel 12512. Accordingly, there is an annular gap 1206 (FIG. 12B) between the outer surface of the injector 1204 and the inner surface of the hydraulic support channel 12512, and part of the body portion of the surface contour element 12108 is slidingly sealingly received in the annular gap 1206. The annular gap 1206 is in fluid communication with the adjustable volume 12586, such that moving the valving block 12578 toward the support block 12504 reduces the adjustable volume 12586, forcing the fluid contained therein to move into the annular gap 1206. When the valving block 12578 engages the support block 12504 as shown in FIGS. 12A to 12C, the valving members 12580 engage the valve apertures 12576 to close the cone valves 12582, trapping fluid in the annular gap 1206 to support the surface contour elements 12108. When the valving block 12578 moves away from the support block 12504, the cone valves 12582 open to allow fluid to escape from the annular gap 1206 and release the surface contour elements 12108 to move freely.

The injector 1204 has an injection lumen 1208 (FIG. 12B) extending longitudinally therethrough. The injection lumen 1208 also extends inferiorly through the conical valving member 12580 into the valving block 12578, and the injection lumen 1208 is in fluid communication with a fluidic piping network 1210 formed in the valving block 12578. As such, various fluids can be pumped through the valving block 12578, the conical valving member 12580 and the injection lumen 1208 into the lumen 1202 of the surface contour element 12108 and through a fluid aperture 1212 in the head 12124 of the surface contour element 12108. It should be noted that the fluidic piping network 1210, the injection lumen 1208 and the lumen 1202 of the surface contour element 12108 are not in fluid communication with the adjustable volume 12586 and are not in fluid communication with the annular gap 1206 between the injector 1204 and the hydraulic support channel 12512. Thus, although in the illustrated embodiment the fluidic piping network 1210 extends through the valving block 12578 and the injection lumen 1208 extends through the conical valving member 12580 into the valving block 12578, the injection system is functionally separate and distinct from the hydraulic support system 12500.

For ease of illustration, only a single exemplary injection-capable surface contour element 12108 is shown, together with the associated portions 12500P, 104P of the second exemplary hydraulic support system 12500 (accommodating the injection system) and the guide structure 104. As will be readily understood in view of the foregoing description, a plurality of injection-capable surface contour elements 12108 assembled in combination with a complete hydraulic support system 12500 and guide structure 104 will form an injection-capable polymorphic surface system.

In one embodiment, two opposed injection-capable polymorphic surface systems could be configured to form the halves of a mold having a mold cavity of the desired shape, or a single injection-capable polymorphic surface system could be arranged in opposition to a static mold half or plate, with the injection-capable surface contour elements being coupled in fluid communication, via the fluidic piping network, with a source of liquid material to be molded. With the mold formed by the opposed polymorphic surfaces closed, the material could then be injected into the mold cavity through the lumens in the injection-capable surface contour elements to fill the mold cavity. This type of arrangement is not limited to a single injection-capable polymorphic surface system or two injection-capable polymorphic systems forming opposed mold halves; polymorphic surface systems may be arranged to form faces of a polyhedral mold. Thus, one method for molding an object comprises configuring at least one polymorphic surface system to form at least part of a mold cavity, and injecting material into the mold cavity through lumens defined through at least some of the surface contour elements of the polymorphic surface system(s). It is also contemplated that mold arrangements may combine one or more injection-capable polymorphic surface systems with one or more polymorphic surface systems that are not injection-capable.

In a similar embodiment, different injection-capable surface contour elements may be coupled, via the fluidic piping network, in fluid communication with different material sources so as to be able to deliver different materials into the mold cavity formed by the polymorphic surface system(s). Thus, a first group of injection-capable surface contour elements is coupled in fluid communication with at least one source of a first material, and a second group of injection-capable surface contour elements is coupled in fluid communication with at least one source of a second material, with the second material being different from the first material. This arrangement permits the molding of multi-layer objects. For example, a first mold cavity having a first shape may be formed by the polymorphic surface system(s) and the first material injected into the first mold cavity and allowed to solidify (optionally with active cooling). A second mold cavity having a second shape may then be formed by the polymorphic surface system(s) and the second material injected into the second mold cavity. The intermediate object formed from the first material may be maintained in the desired position and orientation, both during transition of the polymorphic surface system(s) between the first configuration forming the first mold cavity and the second configuration forming the second mold cavity and during injection of the second material into the second mold cavity, by a subset of the surface contour elements. The subset of the surface contour elements can be withdrawn once the second material has solidified sufficiently to maintain the desired orientation of the intermediate object within the second mold cavity while still being sufficiently non-viscous to fill the gaps formed by withdrawal of the subset of the surface contour elements. Optionally, the subset of the surface contour elements may be injection-capable surface contour elements, and can deliver the second material into the gap as they withdraw. The arrangements and methods described above are not limited to two materials and two sequential mold cavities, and can be extended, mutatis mutandis, to three, four or more materials and three, four or more sequential mold cavities. It is also to be appreciated that an individual layer need not completely encapsulate an intermediate object formed by the previous step, and as such a layer may cover only a portion of the surface of the object formed by the preceding layer. For example, a metal reinforcement may be injected into a portion of a plastic component between plastic layers, or onto a surface of a plastic component. It is also contemplated that a fluid not intended to form part of the finished article may be injected using injection-capable surface contour elements. For example, air or an inert gas may be injected against a portion of the surface of a still-molten article to subject that portion of the surface to differential stresses so as to strengthen that portion of the surface or impart surface features thereto. Furthermore, in some embodiments a vacuum may be applied via injection-capable surface contour elements, so that a suitable cooling fluid may be applied via a first set of injection-capable surface contour elements and withdrawn via a second set of injection-capable surface contour elements. Application of a vacuum to an injection-capable surface contour element may be seen conceptually as a negative injection.

Polymorphic surface systems having hollow or injection-capable surface contour elements can be used in further applications besides molding. One such application is printing, in which a polymorphic surface element may be configured into a desired print surface, which may be continuously inked by supplying ink through the lumens of the hollow surface contour elements so as to maintain a continuously inked surface. The use of a polymorphic surface system can provide a dynamically changeable print surface, which can be used in offset printing or direct printing. Other applications for polymorphic surface systems having hollow surface contour elements include vacuforming, where a vacuum can be applied via the lumens, steam forming of wood, and lubricant application.

Another application for injection-capable polymorphic surface systems is 3D printing. A first group of injection-capable surface contour elements may be coupled in fluid communication with at least one source of a first material, a second group of injection-capable surface contour elements may be coupled in fluid communication with at least one source of a second material, and so on, to enable simultaneous 3D printing using two or more materials.

Additionally, by applying a vacuum to one or more injection-capable surface contour elements, the injection-capable surface contour element(s) may be used to draw fluid from one or more sample sources, for example in a robotic armature used in biological sampling. In such embodiments, one or more of the injection-capable surface contour elements may be provided with a suitable sharpened, needle-shaped head.

In addition, polymorphic surface systems as described herein may be applied to rapid prototyping. By having the controller direct movement of the surface contour elements so that the polymorphic surface assumes a desired surface topography, a transient model of a desired product, or a portion thereof, can be rapidly generated for initial testing. For example, when the polymorphic surface has sufficient resolution and comprises a resilient surface layer, the polymorphic surface can be made to conform to a proposed automotive body shape for initial wind tunnel testing. Temporary models generated by polymorphic surface systems as described herein may also be used to test inter-fit of various parts.

In a preferred embodiment, the controller 122 is further adapted to detect the linear position of each surface contour element 108 relative to its respective cavity 112, and sensors coupled to the controller 122 may be incorporated into or otherwise associated with the guide structure 104 to achieve this end. Such sensors may measure the current generated through an inductor as a result of a gradient magnetic field moving past the sensor's position (i.e. the body portion 128 of each surface contour element 108 will create a current).

Figure 7:
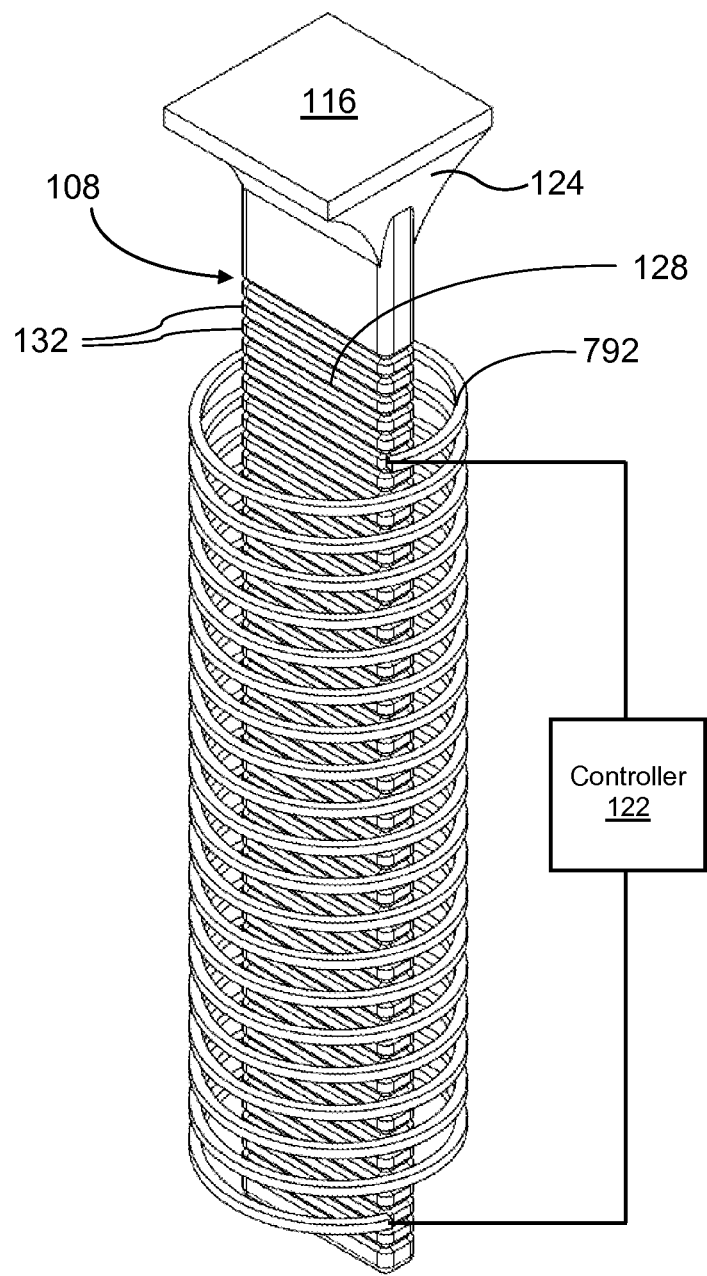
FIG. 7 shows the positioning of an exemplary solenoid sensor relative to a respective surface contour element.

Reference is now made to FIG. 7, which shows the positioning of an exemplary solenoid sensor 792 relative to a respective surface contour element 108. The solenoid sensor 792 comprises a helix of wire that may be embedded in the guide structure 104 (not shown in FIG. 7) surrounding and extending longitudinally along a respective cavity 112 (also not shown in FIG. 7) so that the helix will loosely surround the body portion 128 of the surface contour element 108. As the body portion 128 of the surface contour element 108 moves within the cavity 112 a positive or negative current, depending on the direction of movement, will be generated in the solenoid sensor 792, with the amount of current generated being proportional to the rate of motion of the surface contour element 108. The generated current can be detected and analyzed by the controller 122 to determine the linear position of the surface contour element 108 relative to the cavity 112.

Figure 8:
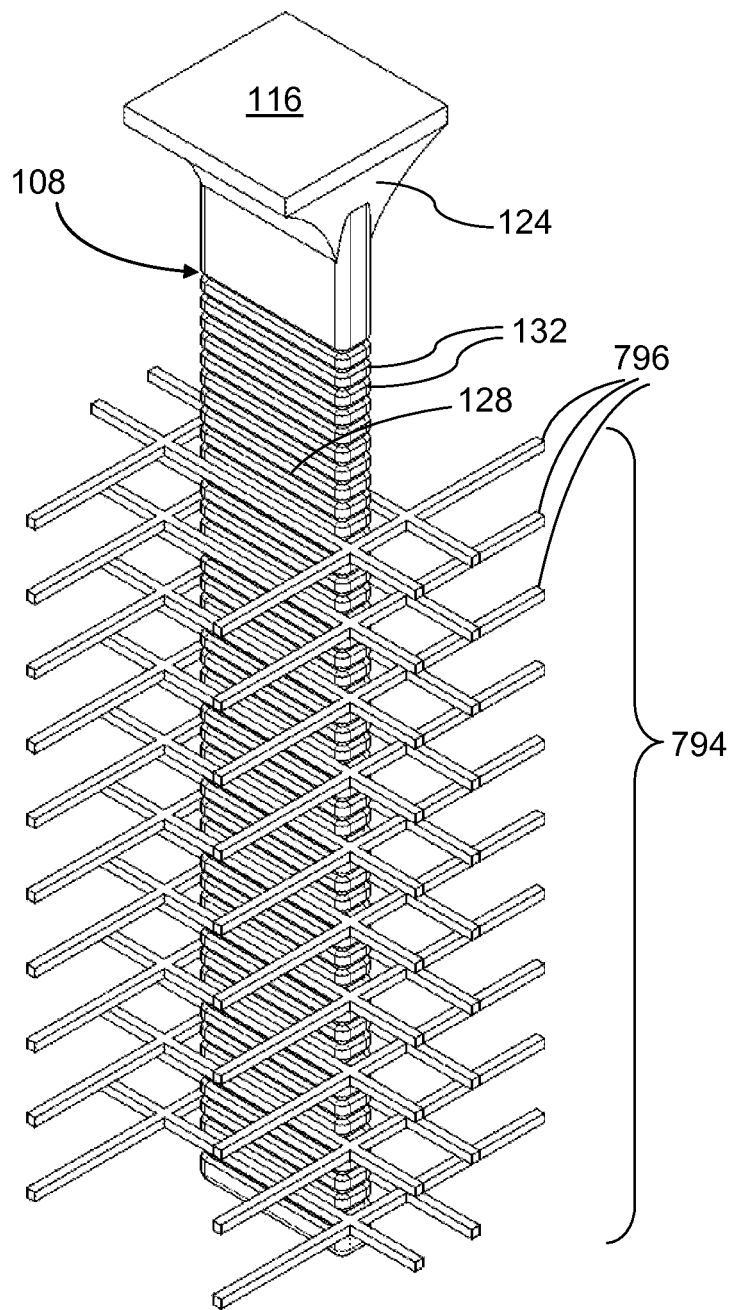
FIG. 8 shows the positioning of an exemplary passive matrix sensor relative to a respective surface contour element.

Instead of solenoid sensors, a passive matrix arrangement may be coupled to the controller 122 and used to enable the controller 122 to detect the linear position of each surface contour element 108 relative to its respective cavity 112. FIG. 8 shows the positioning of an exemplary passive matrix sensor 794 relative to a respective surface contour element 108. The passive matrix sensor 794 comprises a layered mesh of conductive trace layers 796 embedded in the guide structure 104 (not shown in FIG. 8) surrounding and extending longitudinally along the cavities 112 (also not shown in FIG. 8) so that the series of conductive trace layers 796 will loosely surround the body portion 128 of each surface contour element 108. Similarly to the solenoid sensor 792 (FIG. 7), movement of the body portion 128 of the surface contour element 108 within the cavity 112 will induce a current into certain ones of the conductive trace layers 796, which current can be detected by the controller 122 (not shown in FIG. 8). However, instead of detecting movement of each surface contour element 108 separately as with the solenoid sensors 792, the passive matrix arrangement will detect movement of all of the surface contour elements 108 simultaneously by measuring the current at the beginning and end of each conductive trace layer 796. The controller 122 can implement a matrix solver algorithm to mathematically determine the speed and position of each surface contour element 108.

In other embodiments, the linear position of each surface contour element 108 relative to its respective cavity 112 may be detected by the use of laser or acoustic ranging to detect reflections from the inferior end of the surface contour elements 108 (i.e. the ends opposite the heads 124).

Where a polymorphic surface system as described herein includes sensors, such as the solenoid sensors 792 or the passive matrix sensor 794, for detecting movement of the surface contour elements, the controller may be further adapted to detect resistance to sliding linear motion of individual surface contour elements by comparing an expected rate of sliding linear motion to an actual rate of sliding linear motion. This permits a polymorphic surface system as described herein to be used as a measuring device to measure the surface topography of an object. The controller can cause the surface contour elements to be retracted (i.e. positioned so that the heads thereof are as close as possible to the guide structure), and the object to be measured can then be placed on the polymorphic surface formed by the retracted surface contour elements. The controller can then cause the surface contour elements to extend (i.e. move the heads thereof away from the guide structure). When a surface contour element engages the surface of the object to be measured, its rate of movement will decrease because of the physical resistance of the object, and this detected decrease in the rate of movement can be detected by the controller as indicating the presence of the object such that the topography of the object can be mapped.

It is also contemplated that, in an embodiment where the cores 136 (see FIGS. 2B and 2D) of the surface contour elements 108 are magnetic or magnetized, the controller 122 may be adapted to function in a passive measurement mode to detect current induced across each circuit segment 152 by movement of the respective surface contour element 108 under external force. In such an embodiment, the polymorphic surface system may be used to measure the surface topography of an object. For example, in the arrangement shown in FIGS. 5A to 5F and FIGS. 6A to 6C, the hydraulic support system 500 may be used to support the surface contour elements 108 so that the polymorphic surface 120 is generally planar as shown. An object to be measured could then be placed on the polymorphic surface 120, and the mass of the object would cause some of the surface contour elements 108 to be displaced toward the valving block 578 as the polymorphic surface 120 assumes the shape of the object being measured. The surface contour elements 108 would be displaced by different distances according to the shape of the measured object, resulting in different currents being induced across each circuit segment 152 (FIG. 3D). These currents could then be detected by the controller 122 and used to develop a three-dimensional model of the portion of the object surface that engaged the polymorphic surface 120.

In addition to measuring surface topography of an object, it is also contemplated that polymorphic surface systems may be adapted for testing mechanical properties of an object's surface. To achieve this, the surface contour elements 108 could be driven against the surface of the object and the effect of the impact could be measured by relating the force exerted by the surface contour element 108 and its displacement (position) as given by the sensing element. In one implementation, the surface contour elements 108 could be placed in contact with the object being tested and a constant force applied while the displacement is measured or, conversely, a constant rate of displacement could be achieved while measuring the applied force. The force produced by a given surface contour element 108 will be a function of the current flowing through the conductive path(s) 132 of that surface contour element 108, and the position of each surface contour element 108 can be determined by a suitable sensor arrangement, such as the sensor arrangements described above. In addition, measurements of surface properties may also be obtained by driving surface contour elements 108 against the surface of the object being measured to generate impacts therebetween. By oscillating or pulsing the surface contour elements 108 into and out of contact with the surface being measured and varying the frequency, or by varying the velocity at which the surface contour elements 108 impact the object surface, non-Newtonian properties of the surface (which depend on shear rate) could also be determined.

Figure 14A:
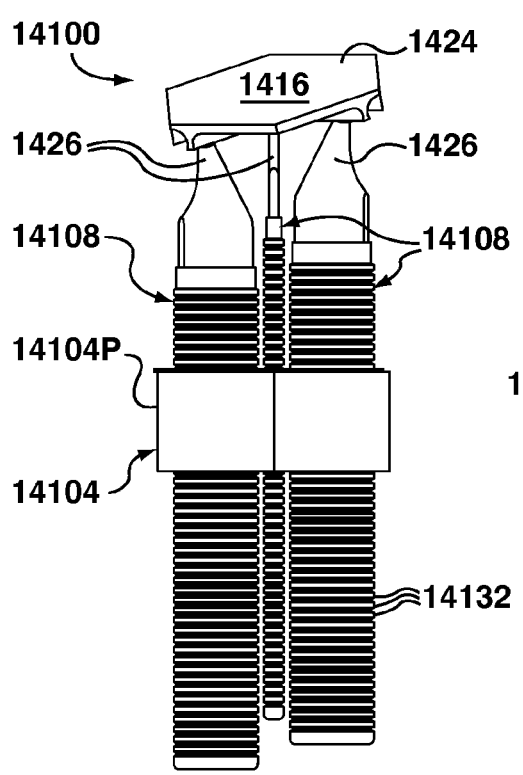
FIG. 14A is a first side elevation view of a portion of a third exemplary polymorphic surface system.
Figure 14B:
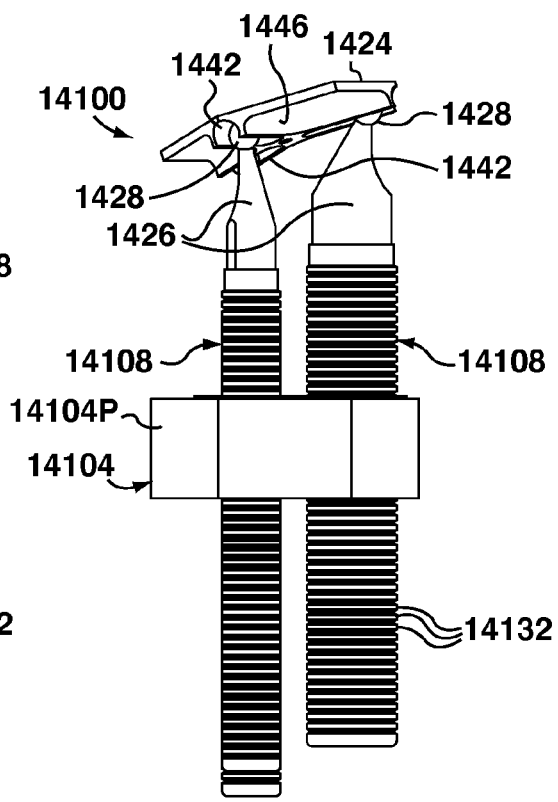
FIG. 14B is a second side elevation view of the portion of the polymorphic surface system shown in FIG. 14A.
Figures 14C, 14D:
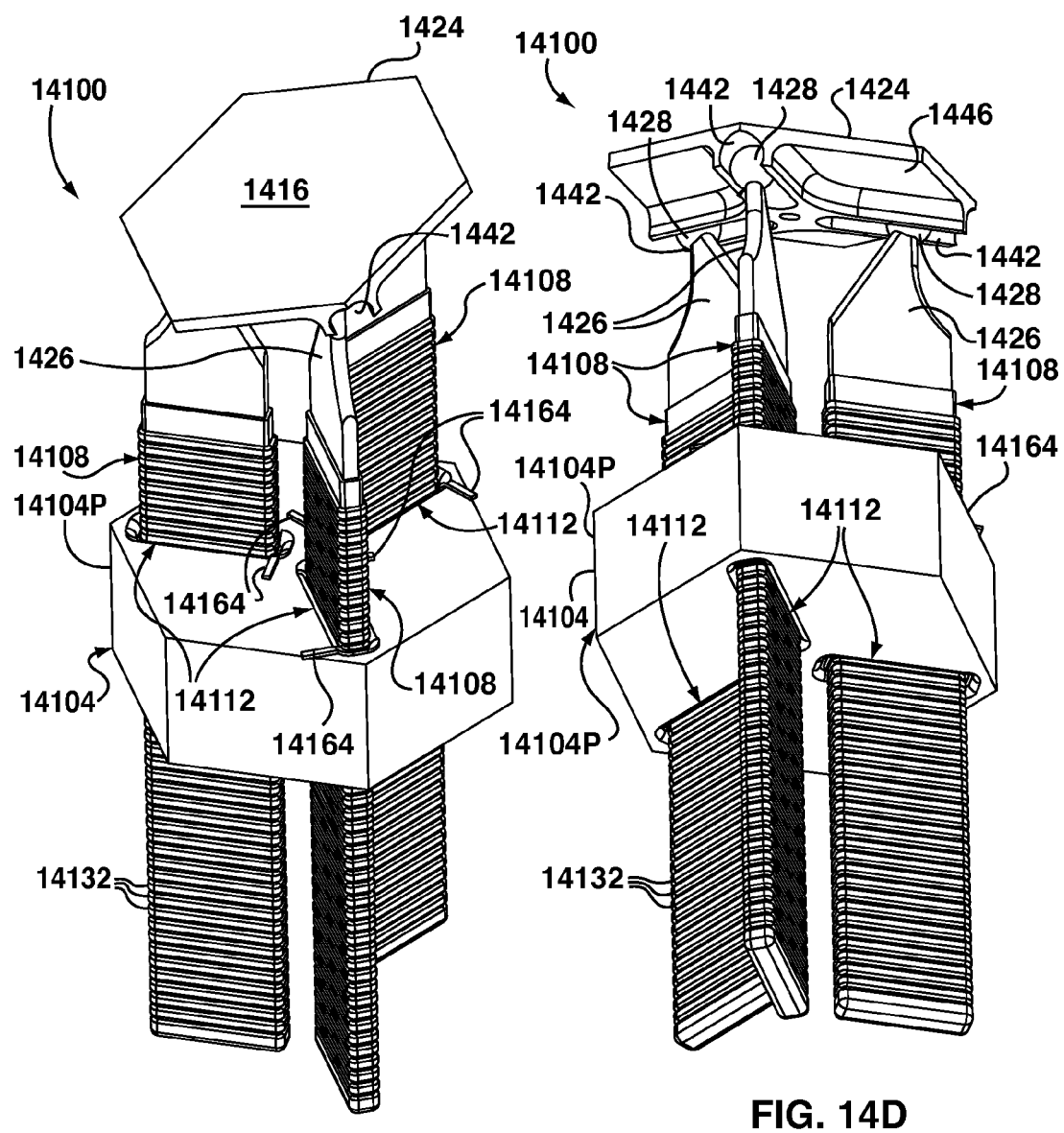
FIG. 14C is a top isometric view of the portion of the polymorphic surface system shown in FIG. 14A.
FIG. 14D is a bottom isometric view of the portion of the polymorphic surface system shown in FIG. 14A.
Figure 14E:
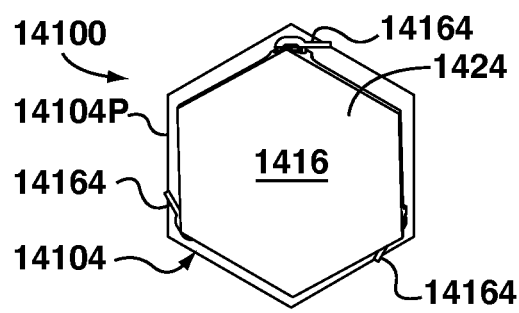
FIG. 14E is a top plan view of the portion of the polymorphic surface system shown in FIG. 14A.
Figure 14F:
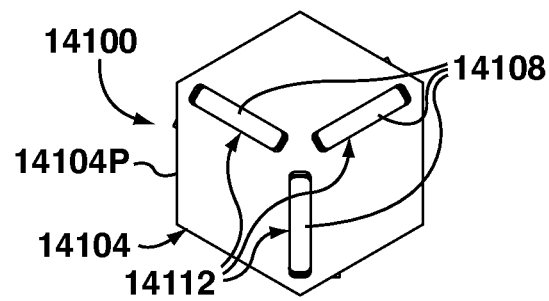
FIG. 14F is a bottom plan view of the portion of the polymorphic surface system shown in FIG. 14A.
Figure 14N:
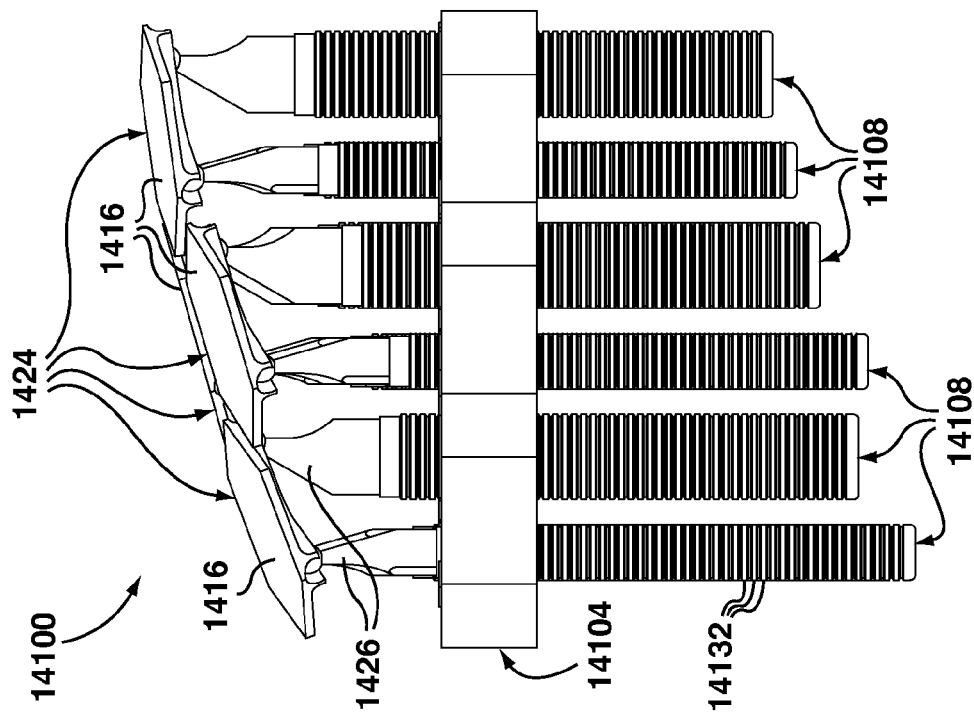
FIG. 14N is a second side elevation view of a portion of the exemplary polymorphic surface system of FIG. 14A.
Figure 14M:
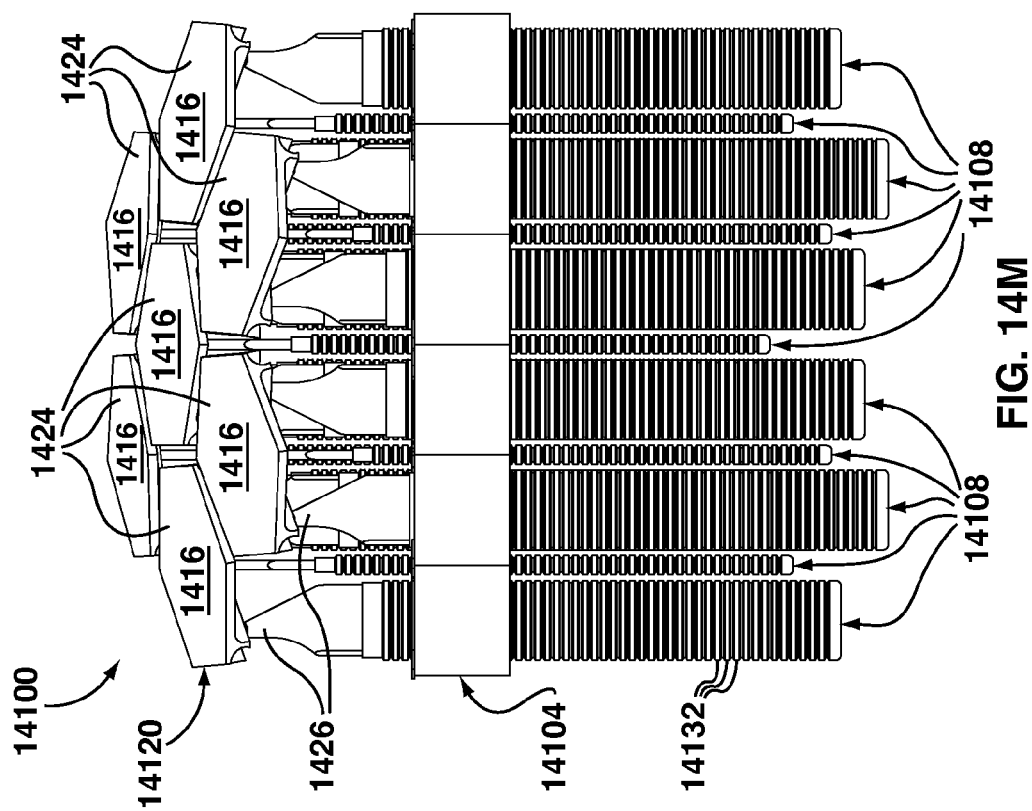
FIG. 14M is a first side elevation view of the exemplary polymorphic surface system of FIG. 14A.
Figure 14O:
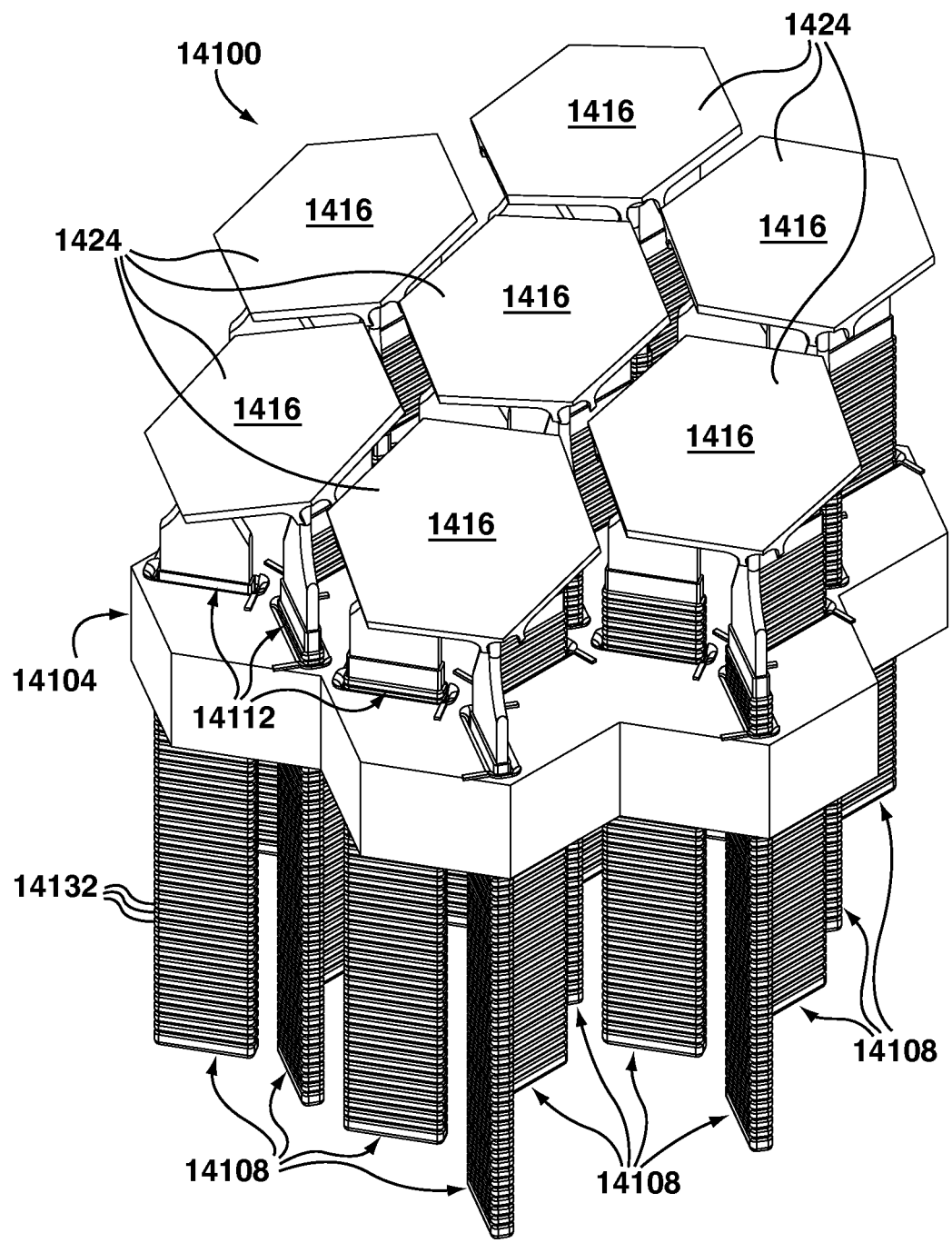
FIG. 14O is a top isometric view of a portion of the exemplary polymorphic surface system of FIG. 14A.

Reference is now made to FIGS. 14A to 14O, which illustrate a third exemplary embodiment of a polymorphic surface system, denoted generally by reference numeral 14100. The third exemplary polymorphic surface system 14100 shown in FIGS. 14A to 14O functions in the same way as the first polymorphic surface system 100, that is, by way of current interacting with a magnetic field to generate a Lorentz force that drives guided substantially linear motion of the surface contour elements 14108. As such, corresponding reference numerals denote corresponding features, except with the additional prefix "14". Moreover, the surface contour elements 14108 of the third polymorphic surface system 14100 are "headless" and are pivotally coupled to hexagonal surface crowns 1424 which cooperate to form the polymorphic surface 14120 as shown in FIGS. 14L to 14O. A portion of the third exemplary polymorphic surface system 14100 including three surface contour elements 14108 and a portion 14104P of the guide structure 14104 is shown in FIGS. 14A to 14F, FIGS. 14G to 14I show an exemplary surface contour element 14108, FIGS. 14J to 14L show a surface crown 1424 and FIGS. 14M to 14O show the complete polymorphic surface system 14100.

As can be seen in FIGS. 14A to 14D and 14F, three surface contour elements 14108 are coupled to each surface crown 1424, and each surface contour element 14108 is coupled to only a single surface crown 1424. Because each surface contour element 14108 is coupled to only a single surface crown 1424, the position and orientation of each surface crown 1424 can be set independently of the position and orientation of each other surface crown 1424, although the footprint of each surface crown 1424 covers three surface contour elements 14108.

The surface contour elements 14108 are similar to the surface contour elements 108 in the first embodiment except that instead of a head 124, each surface contour element 14108 has a cornute superior end 1426 which terminates in a ball 1428. The surface crowns 1424 each have a regular hexagonal shape and a generally planar superior surface 1416, and have three radially arranged penannular channels 1442 on the inferior surface 1446 thereof; the penannular channels 1442 are arranged at 120 degree intervals. Each of the balls 1428 is slidingly received in a respective one of the penannular channels 1442 so as to be able to slide along the penannular channel 1442 and also pivot within the penannular channel 1442. Thus, the cornute superior end 1426 and ball 1428 combination of each surface contour element 14108 forms a ball stud and cooperates with the respective penannular channel 1442 to form a sliding ball joint.

The vertical position of each surface crown 1424 is determined by the average vertical position of the three surface contour elements 14108 to which that surface crown 1424 is coupled and the angular orientation of the surface crown 1424 is determined by the relative differences among the vertical positions of the three surface contour elements 14108 to which that surface crown 1424 is coupled. As an alternative to coupling the surface contour elements 14108 to the surface crowns 1424 by having the surface contour elements 14108 slide within channels 1442 formed in the surface crowns 1424, the surface contour elements may be coupled to the surface crowns by way of an elastic deformable membrane.

Reference is now made to FIGS. 15A to 15J, which show a fourth exemplary polymorphic surface system, indicated generally by the reference 15100. The fourth exemplary polymorphic surface system 15100 is similar in overall structure to the first polymorphic surface system 100, and as such corresponding reference numerals denote corresponding features, except with the additional prefix "15". Like the first polymorphic surface system 100, the fourth exemplary polymorphic surface system 15100 functions by way of current interacting with a magnetic field to generate a Lorentz force that drives guided substantially linear motion of the surface contour elements 15108. However, the structure of the fourth exemplary polymorphic surface system 15100 used to generate the Lorentz force differs from the corresponding structure of the first polymorphic surface system 100, as will be explained further below. FIGS. 15A to 15F show the complete polymorphic surface system 15100, and a more detailed view of a portion of the fourth exemplary polymorphic surface system 15100 including a single surface contour element 15108 and a portion 15104P of the guide structure 15104 is shown in FIGS. 15G to 15J.

The fourth exemplary polymorphic surface system 15100 comprises a guide structure 15104 and plurality of surface contour elements 15108. The guide structure 15104 has a plurality of individual cavities 15112 formed therein, and each surface contour element 15108 is slidably received in a respective one of the individual cavities 15112 for guided reciprocal substantially linear motion, denoted in the drawings by arrow "S", within the respective cavity 15112. Each of the surface contour elements 15108 generates a respective magnetic field, the direction of which is indicated in the drawings by the arrow "M". For example, the surface contour elements 15108 may be formed from, or contain, a suitable magnetized ferromagnetic material to generate the magnetic field M. Respective circuit segments 15152 of an electrical circuit extend across each cavity 15112; in the illustrated embodiment each circuit segment comprises a first side electrical contact 15144, a second side electrical contact 15148, and at least one electrically conductive bridge 15132 extending across the cavity 15112 and connecting the first side electrical contact 15144 and the second side electrical contact 15148 in electrical communication with one another. Accordingly, the first side electrical contact 15144, the electrically conductive bridge 15132 in the cavity 15112 and the second side electrical contact 15148 cooperate to form the circuit segment 15152. The electrical circuit further includes a controller 15122 adapted to individually address the circuit segments to selectively apply current to, and remove current from, one or more selected circuit segments 15152.

Figure 15A:
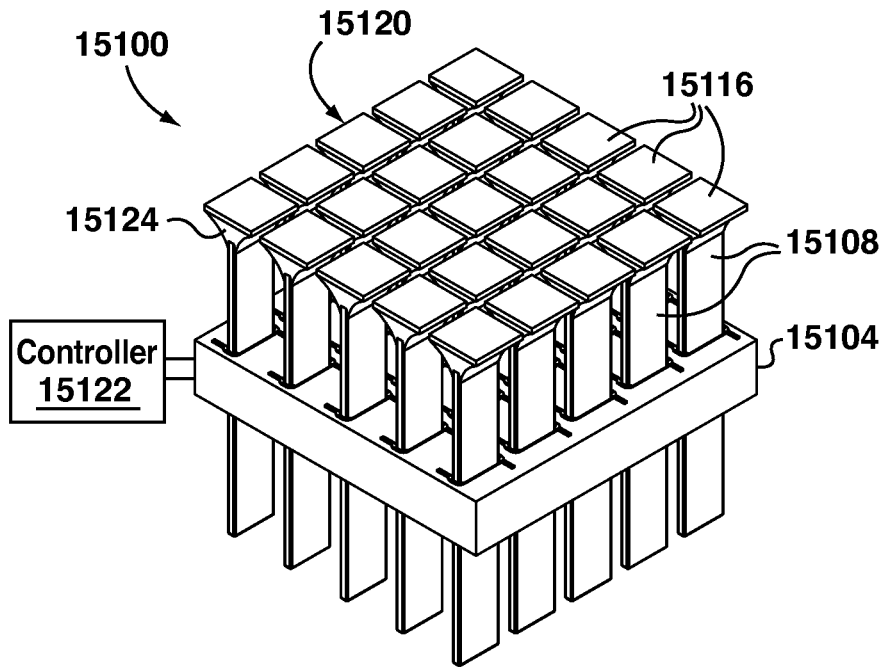
FIG. 15A is a top isometric view of a fourth exemplary polymorphic surface system.
Figure 15B:
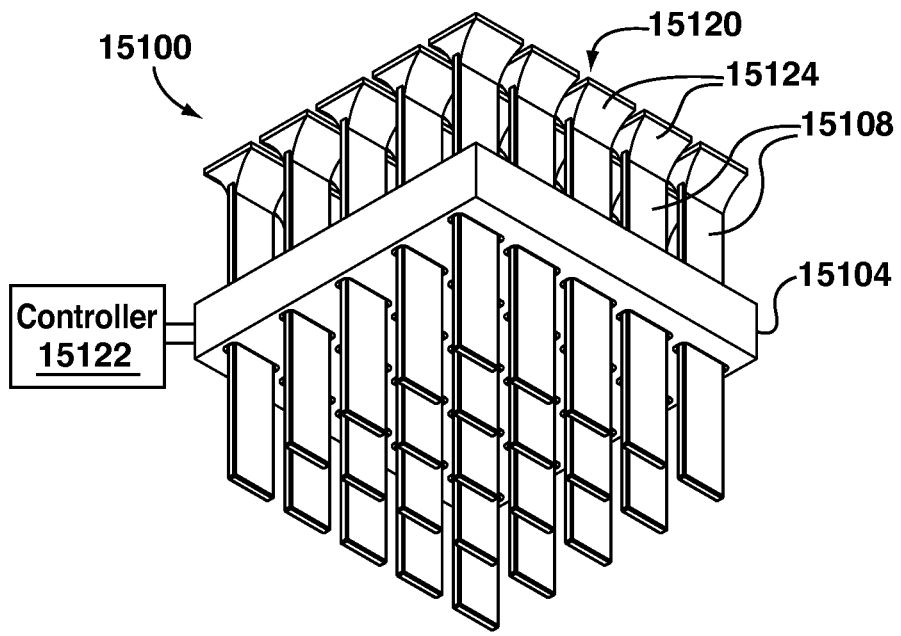
FIG. 15B is a bottom isometric view of the polymorphic surface system of FIG. 15A.
Figure 15C:
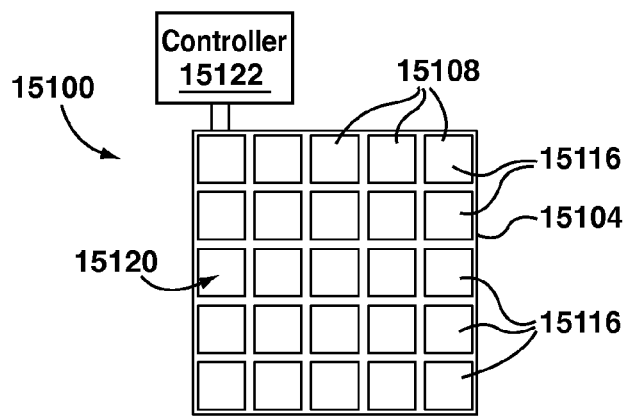
FIG. 15C is a top plan view of the polymorphic surface system of FIG. 15A.
Figure 15D:
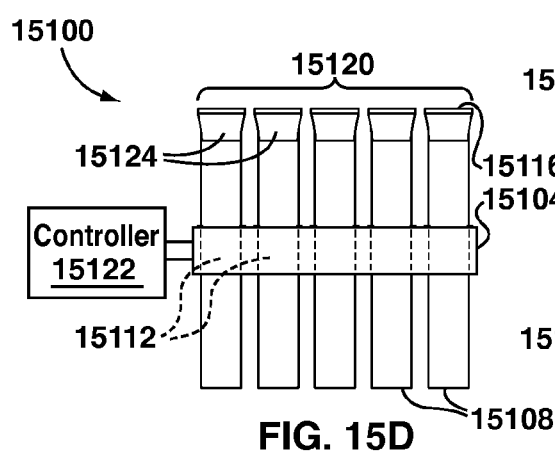
FIG. 15D is a first side elevation view of the polymorphic surface system of FIG. 15A.
Figure 15F:
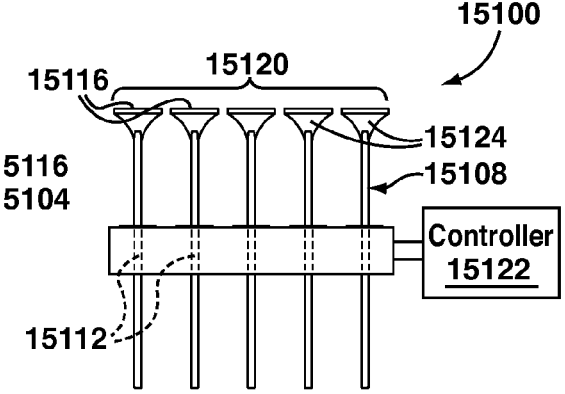
FIG. 15F is a second side elevation view of the polymorphic surface system of FIG. 15A.
Figure 15E:
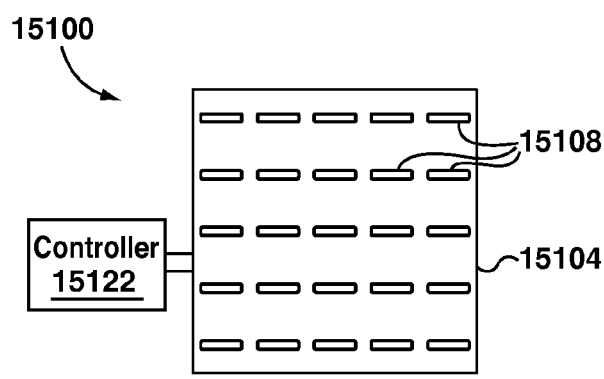
FIG. 15E is a bottom plan view of the polymorphic surface system of FIG. 15A.
Figure 15J:
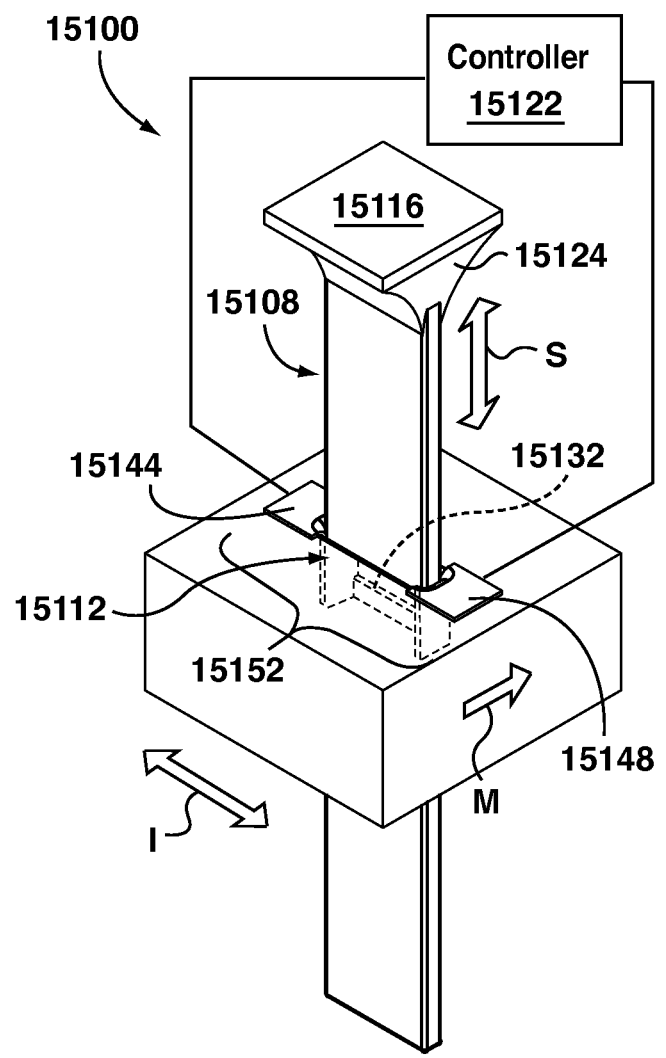
FIG. 15J is a top isometric view of the surface contour element and guide structure portion of FIG. 15G, schematically showing interconnection with a controller.

As can be seen in FIG. 15J, in the illustrated embodiment the current flowing through the circuit segment 15152, indicated by the arrow I, is substantially perpendicular to the magnetic field M across the cavity 15112 and is also substantially perpendicular to the reciprocal sliding linear motion S of the respective surface contour element 15108 within the respective cavity 15112. In FIG. 15G the magnetic field M is perpendicular to the page, and in FIG. 15H the current I is perpendicular to the page. Upon application of current to a selected one of the circuit segments 15152, the applied current I flows through the circuit segment 15152 and interacts with the respective magnetic field M across the respective cavity 15112 to generate a Lorentz force that drives guided substantially linear motion S of the surface contour element 15108 within the cavity 15112. The direction of the current I will determine the direction of sliding linear motion S of the surface contour element 15108; the current I is therefore denoted by a two-headed arrow.

As seen in the detail view shown in FIG. 15I, in a presently preferred embodiment each surface contour element 15108 comprises a magnetized ferromagnetic core 15136 surrounded by an insulating protective layer 15140, preferably of a low friction material. The walls of the cavities 15112 in the guide structure 15104 may similarly be coated with a suitable low friction material.

The structure of the fourth exemplary polymorphic surface system 15100 can be modified and integrated with other structures or arrangements described herein, for example (and without limitation) by being combined with a hydraulic support system and/or secondary support system, or by using surface crowns, or by adding injection capability, or a resilient surface layer.

Figure 16A:
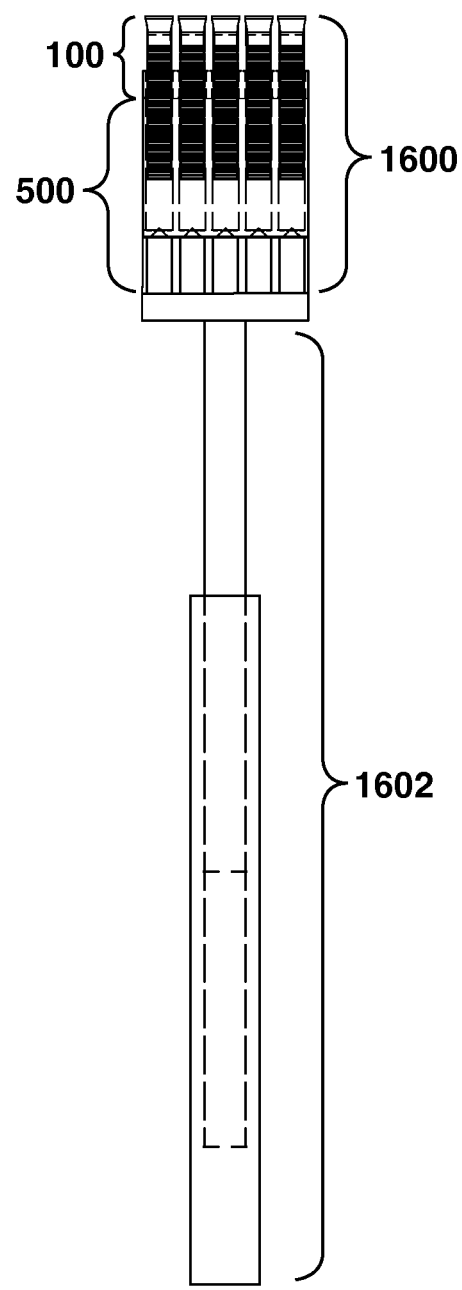
FIG. 16A is a first side elevation view showing an assembly comprising the polymorphic surface system of FIG. 1A in combination with the hydraulic support system of FIG. 5A, with the assembly being carried by a linear actuator.
Figure 16B:
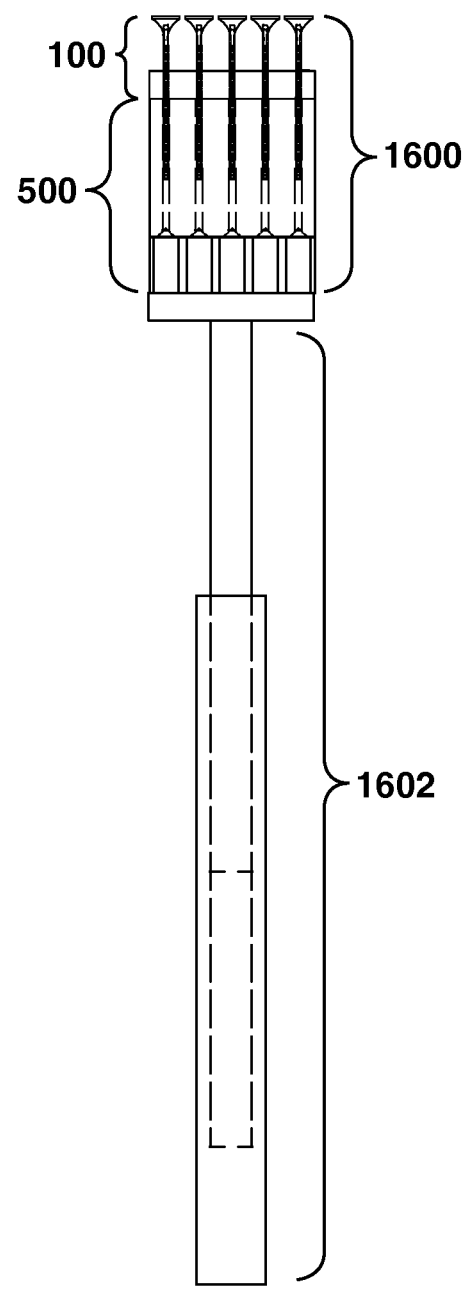
FIG. 16B is a second side elevation view showing the assembly of FIG. 16A carried by the linear actuator of FIG. 16A.
Figure 16C:
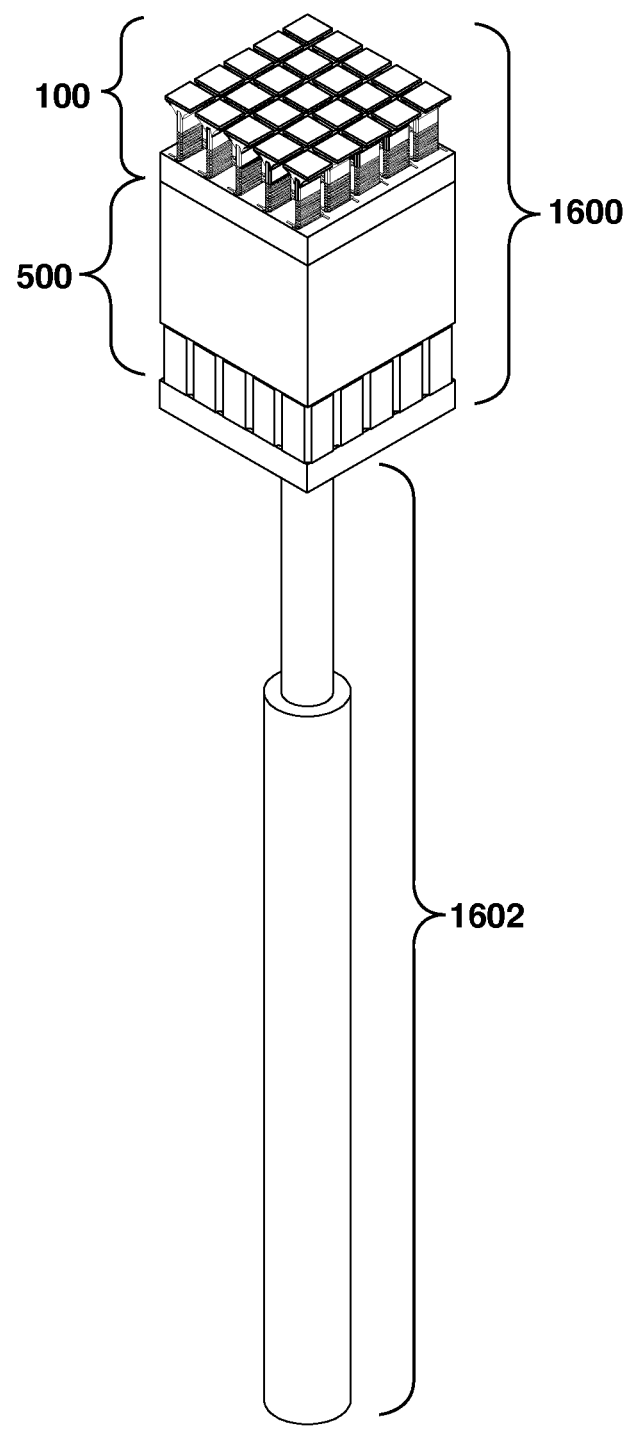
FIG. 16C is a top isometric view showing the assembly of FIG. 16A carried by the linear actuator of FIG. 16A.

An aggregated polymorphic surface arrangement, comprising a plurality of individual polymorphic surface systems of the type shown and described above, is also contemplated. In an aggregated polymorphic surface arrangement, each polymorphic surface system is carried and supported by a respective individual linear actuator so that the entire polymorphic surface system can be moved substantially linearly by the linear actuator, independently of any movement of the individual surface contour elements and independently of the other polymorphic surface systems in the aggregated polymorphic surface arrangement. In a preferred embodiment, the polymorphic surface systems and their respective individual linear actuators are arranged so that substantially linear movement of the polymorphic surface system, as driven by the respective linear actuator, is parallel to the substantially linear movement of the surface contour elements. The linear actuators may be Lorentz force actuators constructed according to the principles described herein, or may be conventional linear actuators such as solenoid actuators or motorized gear-driven actuators. FIGS. 16A to 16C show an assembly 1600 comprising the first exemplary polymorphic surface system 100 in combination with the exemplary hydraulic support system 500, with the assembly 1600 being carried by a linear actuator 1602.

The linear actuators, and hence the polymorphic surface systems 100 carried thereby, may be configured in an array. Thus, an aggregated polymorphic surface arrangement may be an array of individually linearly movable polymorphic surface systems 100, with linear movement of the polymorphic surface systems 100 being in parallel with one another and in parallel with the linear movement of the surface contour elements 108.

The use of an aggregated polymorphic surface arrangement can provide an enhanced topographical range as compared to an individual polymorphic surface system 100. The topographical range of a single polymorphic surface system 100 will be limited by the range of movement of the individual surface contour elements 108, and will not be able to accurately model a surface whose topographical variations exceed this range. The use of an aggregated polymorphic surface arrangement obviates this limitation, since the linear actuators can be used for larger or "gross" topographical position adjustments while the surface contour elements 108 are used for smaller or "fine" topographical position adjustments.

In certain embodiments, polymorphic surface systems as described herein, as well as aggregated polymorphic surface arrangements, may be enhanced by applying color. In the simplest such embodiment, a suitable projector may be arranged to project an image onto the heads 124 of the surface contour elements 108, in a manner similar to that described in Folmer et al., "inFORM: Dynamic Physical Affordances and Constraints through Shape and Object Actuation" (Paper delivered at UIST'13, The 26th Annual ACM Symposium on User Interface Software and Technology, 8-11 Oct. 2013), (2014) CHI '14.

Figure 17:
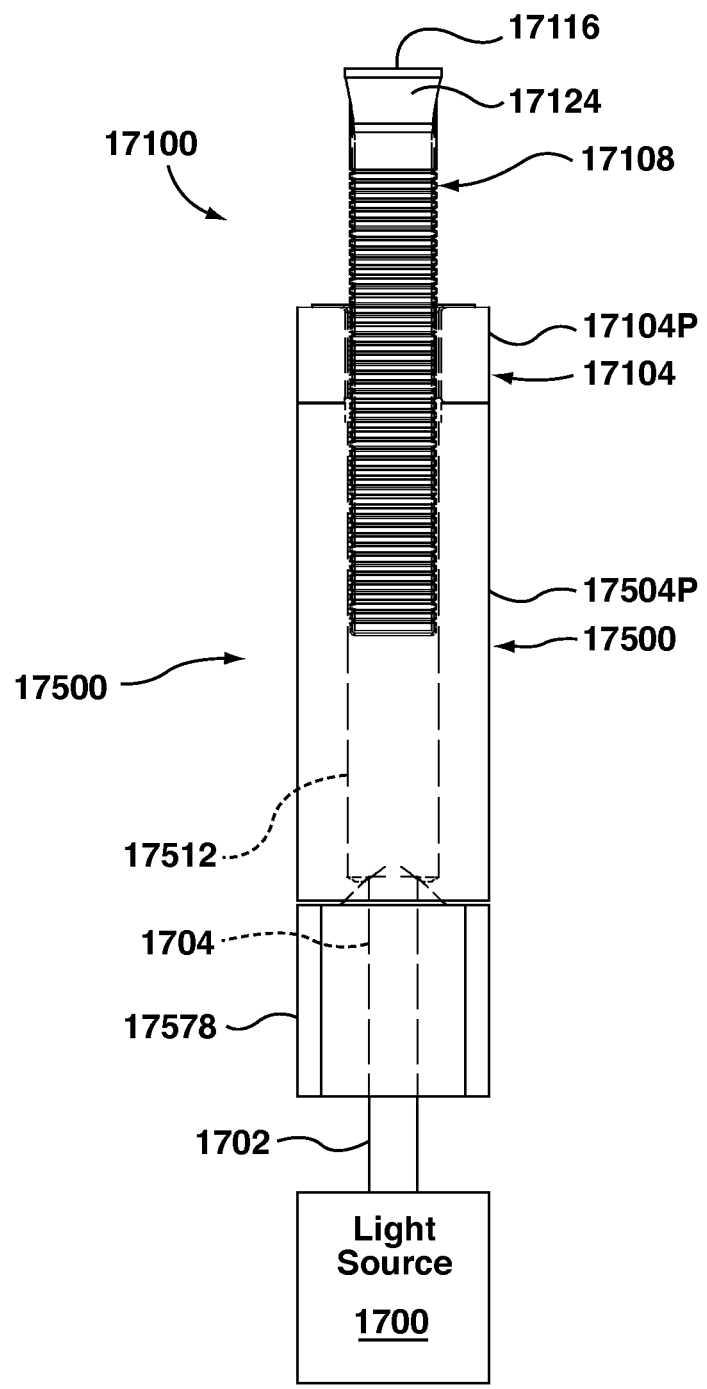
FIG. 17 is a side elevation cut-away view of a portion of a fifth exemplary polymorphic surface system and an associated hydraulic support system.

In another embodiment, the surface contour elements may be formed from a suitable transparent material, such as a suitable glass or plastic, and configured to achieve substantially total internal reflection, other than for light reaching the head of the surface contour element, so that each surface contour element can function as a light conduit, similarly to a fiber optic cable. An array of light emitting devices, such as light emitting diodes or lasers, can be positioned to deliver light to the surface contour elements. For example, an array of light emitting devices could be placed below the guide structure of a polymorphic surface system. The transparent surface contour elements would then carry the delivered light to the heads of the surface contour elements so as to generate an image on the heads of the surface contour elements. The desired refractive index for the surface contour elements may be achieved through material selection, or by coating the edges of the surface contour elements with a suitable reflective cladding layer. In the latter case, the conductive layer will be disposed outside of the cladding layer along with a thin, highly magnetically susceptible layer. FIG. 17 shows portions 17104P, 17500P of a fifth exemplary polymorphic surface system and associated hydraulic support system respectively. The polymorphic surface system 17100 and hydraulic support system 17500 are similar to the first exemplary polymorphic surface system 100 and hydraulic support system 500, with like references denoting like features except with the prefix "17". The fifth exemplary polymorphic surface system 17100 and associated hydraulic support system 17500 differ from the first exemplary polymorphic surface system 100 and hydraulic support system 500 in that the former are adapted to transmit light through the surface contour elements 17108 to the superior surfaces 17116 thereof. A light source, shown schematically as a block 1700, is coupled to an optical fiber 1702 extending through a bore 1704 in the valving block 17578 to transmit light through the hydraulic support channel 17512 to the inferior end of the surface contour element 17108. The interior surface of the hydraulic support channel 17512 may be coated with a reflective material to facilitate light transmission therealong, and the hydraulic fluid used is selected to have a suitable refractive index. The surface contour element 17108 comprises a transparent material that achieves sufficient, and preferably substantially total, internal reflection so that light received at the inferior end of the surface contour element 17108 is transmitted to the superior surface 17116 thereof so as to be visible thereon. Thus, the superior surface 17116 of each surface contour element 17108 functions as a pixel, and by transmitting different colors of light to each surface contour element, an image can be presented on the polymorphic surface formed thereby. Since the superior surface 17116 of each surface contour element 17108 has an X, Y and Z position as well as a color, the superior surface 17116 may be considered a voxel and used to create a three-dimensional image with coloring on its superior surface. For example, the fifth exemplary polymorphic surface system may be used to present a colored topographical map. Other embodiments of a polymorphic surface system which are not associated with a hydraulic support system may also be adapted to transmit light through the surface contour elements to the superior surfaces thereof.

The controller (e.g. controller 122, 15122) for a polymorphic surface system may be, for example, a suitably programmed computer or microcontroller or other suitable device, or a combination of a suitably programmed computer with a microcontroller or other suitable device. For example, a polymorphic surface system may include a microcontroller that is communicatively coupled to a programmed computer. As such, polymorphic surface systems as described herein may be responsive to computer-generated instructions to generate topographical shapes representing three-dimensional information stored in or generated by a computer system. The computer system may fulfill the role of the controller, or may communicate with the controller.

Figure 9:
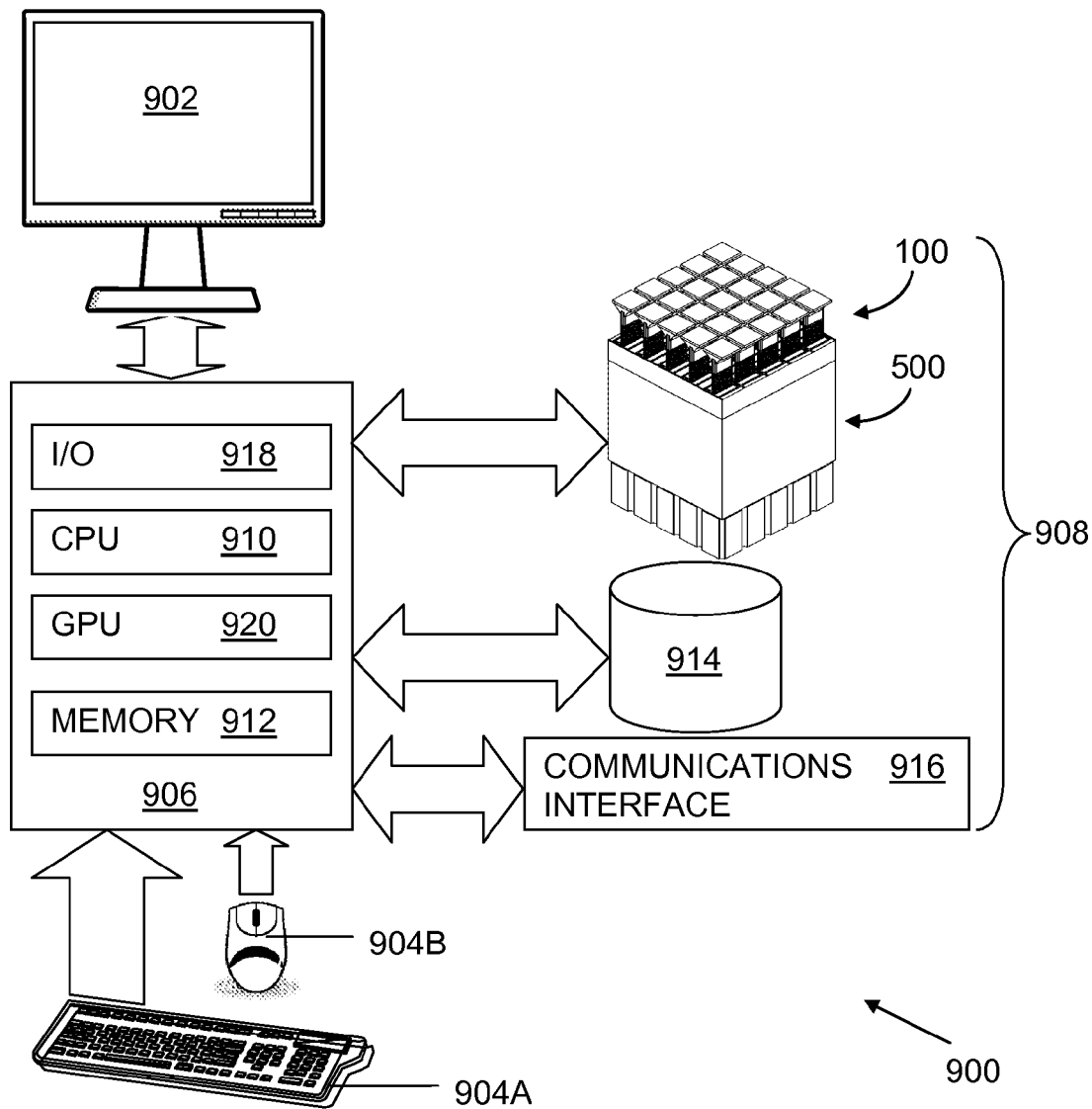
FIG. 9 shows an exemplary computer system including the combination of a polymorphic surface system and hydraulic support system as shown in FIG. 5A.

An illustrative computer system in association with which the polymorphic surface systems herein described may be implemented is presented as a block diagram in FIG. 9. The illustrative computer system is denoted generally by reference numeral 900 and includes a display 902, input devices in the form of keyboard 904A and pointing device 904B, computer 906 and external devices 908 coupled to the computer 906. One of the external devices 908 coupled to the computer 906 includes, as a combination, a polymorphic surface system 100 and hydraulic support system 500 as described above. While pointing device 904B is depicted as a mouse, it will be appreciated that other types of pointing device may also be used. In one embodiment, a polymorphic surface system as described herein may be used as an input device. For example, in some embodiments a polymorphic surface may function as a dynamically adaptive keyboard and/or pointing device. More than one polymorphic surface system may be coupled to a single computer system.

The computer 906 may contain one or more processors or microprocessors, such as a central processing unit (CPU) 910. The CPU 910 performs arithmetic calculations and control functions to execute software stored in an internal memory 912, preferably random access memory (RAM) and/or read only memory (ROM), and possibly additional memory 914. The additional memory 914 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 914 may be physically internal to the computer 906, or external as shown in FIG. 9, or both.

The computer system 900 may also include other similar means for allowing computer programs or other instructions to be loaded. Such means can include, for example, a communications interface 916 which allows software and data to be transferred between the computer system 900 and external systems and networks. Examples of communications interface 916 can include a modem, a network interface such as an Ethernet card, a wireless communication interface, or a serial or parallel communications port. Software and data transferred via communications interface 916 are in the form of signals which can be electronic, acoustic, electromagnetic, optical or other signals capable of being received by communications interface 916. Multiple interfaces, of course, can be provided on a single computer system 900. In one embodiment, it is contemplated that input received at a first polymorphic surface device coupled to a first computer system may be transmitted to a second computer system via a suitable network and presented by a second polymorphic surface device coupled to a second computer system. Such communication may be bi-directional, and may be used, for example, to facilitate telemedicine.

Input and output to and from the computer 906 is administered by the input/output (I/O) interface 918. This I/O interface 918 administers control of the display 902, keyboard 904A, external devices 908, including the combined polymorphic surface system 100 and hydraulic support system 500, and other such components of the computer system 900. The computer 906 also includes a graphical processing unit (GPU) 920. The latter may also be used for computational purposes as an adjunct to, or instead of, the (CPU) 910, for mathematical calculations.

The various components of the computer system 900 are coupled to one another either directly or by coupling to suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

The apparatus described herein represent exemplary, and non-limiting, implementations of a method for dynamically forming a surface topography. This method comprises applying at least one magnetic field across a plurality of movable surface contour elements and selectively passing a current through the magnetic field(s) adjacent selected surface contour elements, with the current being substantially perpendicular to the magnetic field(s). The result is that for each selected surface contour element, the current interacts with the magnetic field to generate a Lorentz force that drives guided substantially linear motion of the respective surface contour element. In certain preferred embodiments, the guided substantially linear motion of the respective selected surface contour element is substantially perpendicular to both the magnetic field(s) and to the current across the selected surface contour elements. Preferably, the surface contour elements are individually moveable and individually selectable for application of current to generate movement. The method may further comprise supporting the surface contour elements in position after removing the current. The method may further comprise controlling the current applied across each selected surface contour element to control the amount of guided substantially linear motion of the selected surface contour element.

In some embodiments of the method, for example in an implementation of the method using the first exemplary polymorphic surface system 100, there may be a single magnetic field. In the first exemplary polymorphic surface system 100, selectively passing a current through the magnetic field adjacent the selected individual surface contour elements is achieved by selectively applying the current across the selected individual surface contour elements by way of the respective electrically conductive paths 132 on the respective surface contour elements 108. Thus, FIGS. 1A to 4B illustrate one implementation of the above-described method.

In other embodiments of the method, for example in an implementation of the method using the fourth exemplary polymorphic surface system 15100, there may be a plurality of individual magnetic fields, with each individual magnetic field being generated by a respective surface contour element. In the fourth exemplary polymorphic surface system 15100, current is selectively passed through the magnetic fields adjacent the selected individual surface contour elements by carrying a current past the selected individual ones of the surface contour elements by way of the electrically conductive bridge 15132. Thus, FIGS. 15A to 15J illustrate another implementation of the above-described method.

In an alternative method, a constant current could be applied to a plurality of individually movable surface contour elements, and a magnetic field could be selectively applied across selected surface contour elements, with the magnetic field preferably being substantially perpendicular to the direction of the current, so that for each selected surface contour element, the current and the magnetic field interact to generate a force that drives guided substantially linear motion of the respective surface contour element. The guided substantially linear motion of the respective surface contour element is preferably substantially perpendicular to both the magnetic field and to the electric field.

Figure 18:
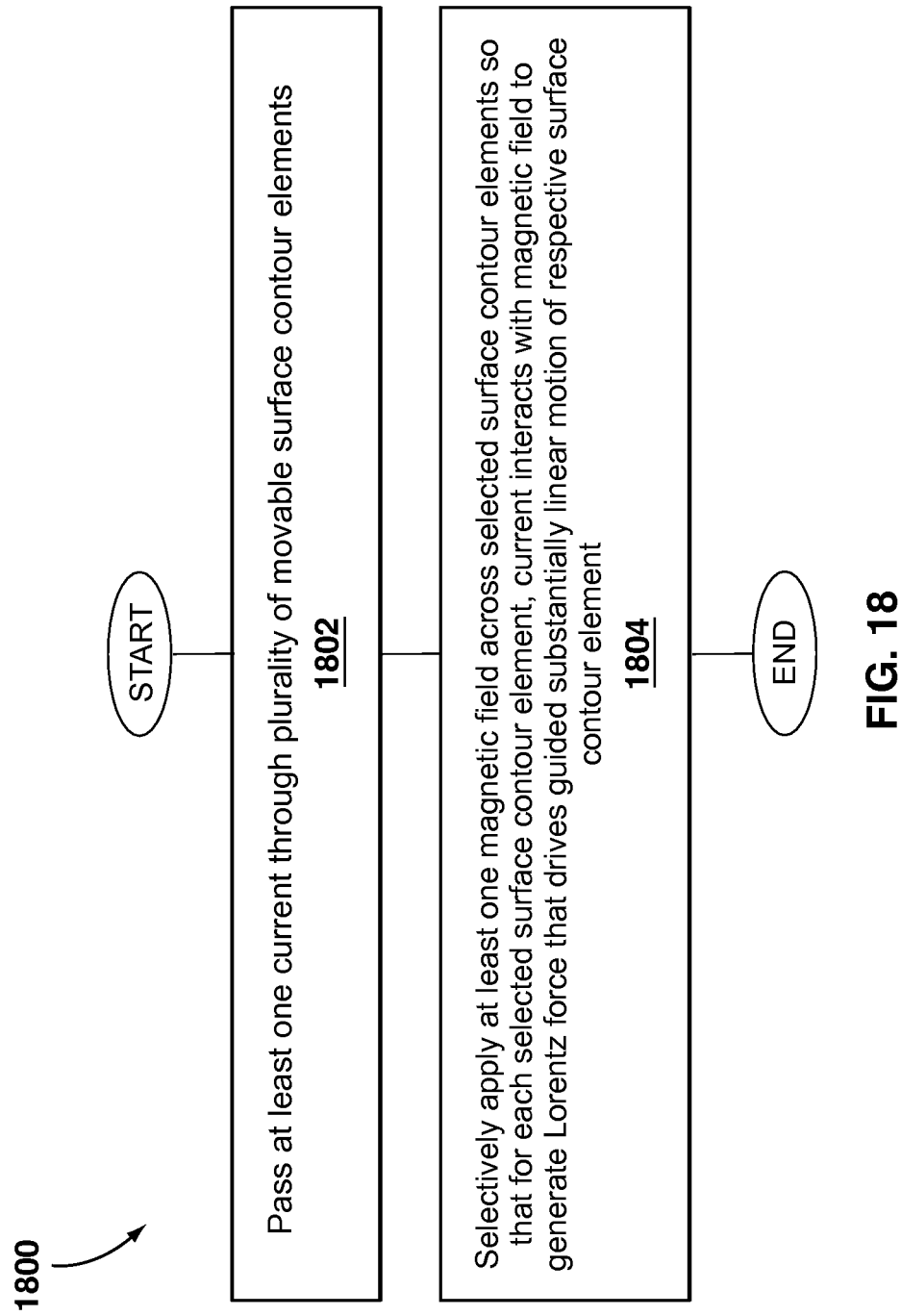
FIG. 18 shows a flow chart for a method for dynamically forming a surface topography.

Reference is now made to FIG. 18, which shows a flow chart for the alternate method 1800 for dynamically forming a surface topography. At step 1802, at least one current is passed through a plurality of movable surface contour elements. A single current may be passed through all of the surface contour elements. Alternatively, each individual surface contour element, or groups of surface contour elements, may receive independent currents. At step 1804, at least one magnetic field is selectively applied across selected ones of the surface contour elements so that for each selected surface contour element, the current interacts with the magnetic field to generate a Lorentz force that drives guided substantially linear motion of the respective surface contour element. This may be achieved, for example, by selectively applying a single magnetic field to all of the surface contour elements while varying the current passed through particular surface contour elements to produce differential movement thereof. Alternatively, a constant current may be passed through the surface contour elements while different magnetic fields are applied to individual surface contour elements or groups of surface contour elements, with the strength of the magnetic field being varied to produce differential movement. Preferably, in the method 1800 shown in FIG. 18 the current is substantially perpendicular to the at least one magnetic field and the guided substantially linear motion of the respective selected surface contour element is substantially perpendicular to both the at least one magnetic field thereacross and to the current. One or more electromagnets may be used to selectively apply the magnetic field(s); in one embodiment the electromagnets may comprise individual coils embedded in the guide structure adjacent each cavity in which a surface contour element is received.

Figure 19:
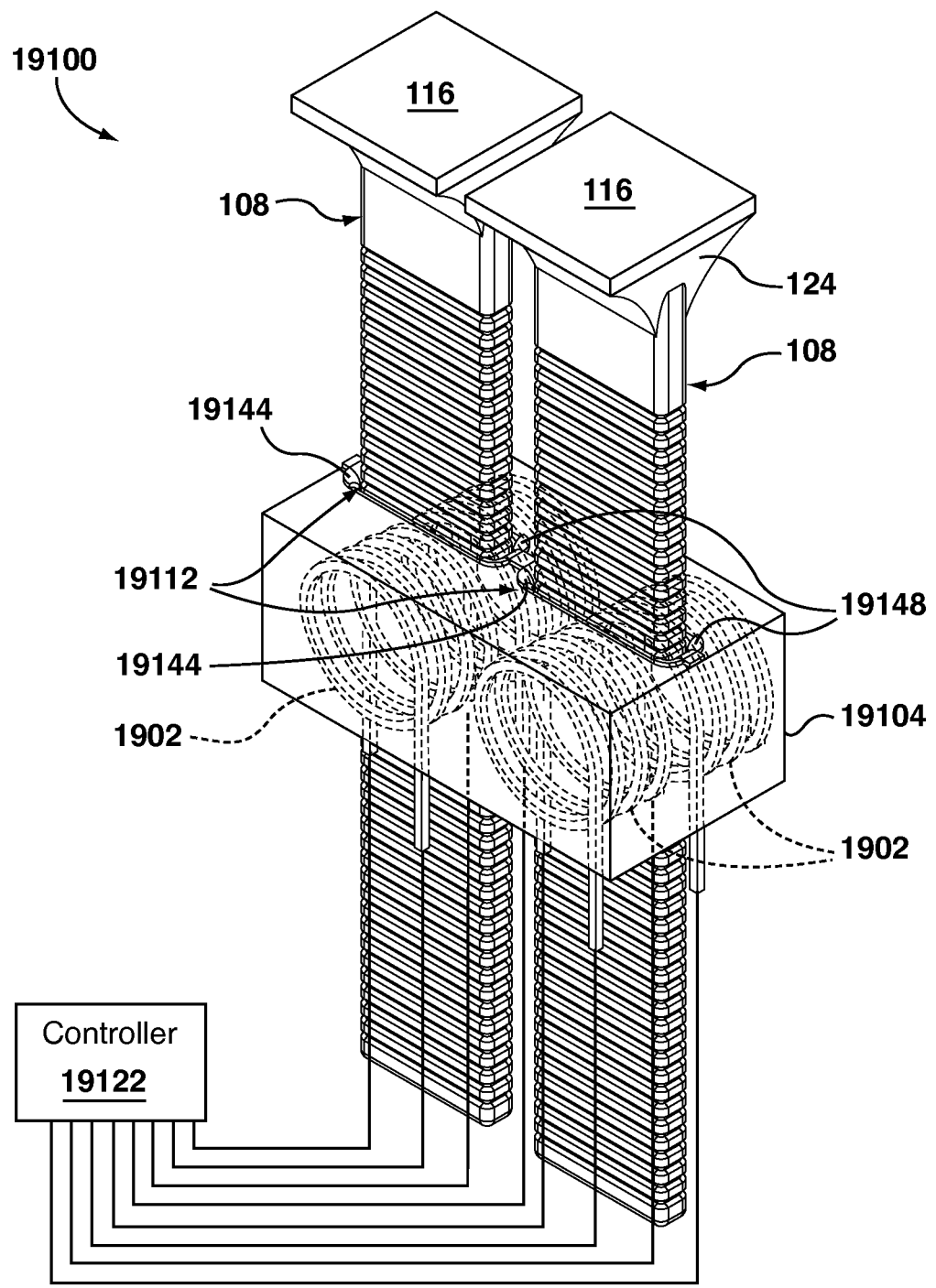
FIG. 19 shows a top isometric view of a portion of a sixth exemplary polymorphic surface system.

FIG. 19 shows a top isometric view of a portion of a sixth exemplary polymorphic surface system 19100 which may be used to implement the method 1800. The sixth exemplary polymorphic surface system 19100 comprises a guide structure having a plurality of individual cavities 19112 formed therein and a plurality of surface contour elements 108. The surface contour elements 108 used in the sixth exemplary polymorphic surface system 19100 are identical to the surface contour elements 108 used in the first exemplary polymorphic surface system 100 and hence are denoted with the same reference numerals. Each surface contour element 108 is received in a respective one of the individual cavities 19112 for reciprocal substantially linear motion therein. The portion of the sixth exemplary polymorphic surface system 19100 shown in FIG. 19 includes two surface contour elements 108 and two cavities 19112 for simplicity of illustration. Electrical contacts are associated with each cavity 19112. For each cavity, the electrical contacts comprise a first side electrical contact 19144 and a second side electrical contact 19148; in other embodiments each cavity may have a plurality of first side electrical contacts and/or a plurality of second side electrical contacts. The first side electrical contact 19144 is electrically isolated from the second side electrical contact 19148 except for the surface contour element 108 in the cavity, which maintains electrical communication between the first side electrical contact 19144 and the second side electrical contact 19148 over a range of the reciprocal substantially linear motion of the respective surface contour element 108 within the respective cavity 19112. The first side electrical contact 19144, the respective surface contour element 108 in the cavity 19112 and the second side electrical contact 19148 cooperate to form a circuit segment of an electrical circuit across the cavity 19112. Electromagnetic coils 1902 are embedded in the guide structure 19104 adjacent the cavities 19112 and positioned to apply a magnetic field across the respective cavity 19112. For example, the electromagnetic coils 1902 may be deposited in slots adjacent the cavities 19112 and then sealed in place using a suitable insulating epoxy. As shown schematically in FIG. 19, a controller 19122 is coupled to the electromagnetic coils 1902 and is adapted to address the electromagnetic coils 1902 to selectively apply current to, and remove current from, one or more selected electromagnetic coils 1902 to energize the electromagnetic coils 1902 and thereby generate a magnetic field across the respective cavity 19112. The current passing through the surface contour elements 108 interacts with the magnetic field applied across the respective cavity 19112 to generate a Lorentz force that drives substantially linear motion of the respective surface contour element 108 within the respective cavity 19112. While in a preferred embodiment the controller 19122 can individually address each electromagnetic coil 1902 to individually control each surface contour element 108, in other embodiments the controller 19122 may address groups of electromagnetic coils 1902 to control groups of surface contour elements 108. The controller 19122 may control the current applied to each electromagnetic coil 1902 by controlling the magnitude of the current and/or the duration of the current and thereby control the magnitude and/or duration of the magnetic field. The controller 19122 may optionally be further coupled to the circuit segments 19152 to vary the current applied thereto (not shown in FIG. 19).

Certain currently preferred embodiments have been described by way of example. It will be apparent to persons skilled in the art that a number of variations and modifications can be made without departing from the scope of the claims.

What is claimed is:

1. A polymorphic surface system, comprising:
  a guide structure;
  a plurality of individual cavities formed in the guide structure;
  a plurality of surface contour elements, each surface contour element being received in a respective one of the individual cavities for reciprocal substantially linear motion therein;
  each of the surface contour elements having at least one electrically conductive path thereon;
  each of the cavities having a magnetic field extending thereacross;
  electrical contacts associated with each cavity, wherein for each cavity:
    the electrical contacts comprise at least one first side electrical contact and at least one second side electrical contact;
    the at least one first side electrical contact is electrically isolated from the at least one second side electrical contact except for the electrically conductive path on the respective surface contour element in the cavity;
    the at least one electrically conductive path on the respective surface contour element in the cavity maintains electrical communication between the at least one first side electrical contact and the at least one second side electrical contact over a range of the reciprocal substantially linear motion of the respective surface contour element within the respective cavity; and
    the at least one first side electrical contact, the at least one electrically conductive path on
    the respective surface contour element in the cavity and the at least one second side electrical contact cooperate to form a circuit segment of an electrical circuit across the cavity;
  the electrical circuit including a controller adapted to address the circuit segments to selectively apply current to, and remove current from, one or more selected circuit segments; and
  whereby upon application of current to a selected one of the circuit segments, the applied current
  interacts with the magnetic field across the respective cavity to generate a Lorentz force that drives substantially linear motion of the respective surface contour element within the respective cavity.

2. The polymorphic surface system of claim 1, wherein:
  the magnetic field across each cavity is substantially perpendicular to the reciprocal substantially linear motion of the respective surface contour element within the respective cavity; and
  current flowing through the circuit segment is substantially perpendicular to the magnetic field across the cavity and is also substantially perpendicular to the reciprocal substantially linear motion of the respective surface contour element within the respective cavity.

3. The polymorphic surface system of claim 1, wherein the controller is adapted to selectively control the current applied to a selected one of the circuit segments.

4. The polymorphic surface system of claim 1, wherein a single magnetic field extends across all of the cavities.

5. The polymorphic surface system of claim 4, wherein the guide structure comprises a magnetized ferromagnetic material to generate the single magnetic field.

6. The polymorphic surface system of claim 1, wherein a plurality of individual magnets are arranged to provide each cavity with its own magnetic field.

7. The polymorphic surface system of claim 6, wherein the individual magnets are internal to the surface contour elements.

8. The polymorphic surface system of claim 6, wherein the individual magnets are electromagnets.

9. The polymorphic surface system of claim 1, wherein the cavities and the surface contour elements received therein are arranged in a regular grid.

10. The polymorphic surface system of claim 1, wherein:
  each surface contour element has a respective length, width and thickness;
  the length being measured parallel to the reciprocal substantially linear motion of the respective surface contour element;
  the length of each surface contour element is substantially greater than its width; and
  the width of each surface contour element is substantially greater than its thickness.

11. The polymorphic surface system of claim 1, wherein:
  each surface contour element has a head having a generally planar superior surface; and
  the heads of the surface contour elements cooperate to form a polymorphic surface.

12. The polymorphic surface system of claim 1, further comprising a resilient surface layer over the surface contour elements.

13. The polymorphic surface system of claim 1, wherein the surface contour elements comprise a magnetic material.

14. The polymorphic surface system of claim 1, wherein the surface contour elements are arranged in the cavities to move substantially in parallel with one another.

15. The polymorphic surface system of claim 1, wherein the cavities are in valve-governed fluid communication with a fluid source for selectively:
- introducing fluid into the cavities and sealing the fluid within the cavities to support the surface contour elements in the cavity after discontinuing the applied current; and
- withdrawing the fluid from the cavities to release the surface contour elements.

16. The polymorphic surface system of claim 1, wherein the controller is further adapted to detect a linear position of each surface contour element relative to its respective cavity.

17. The polymorphic surface system of claim 1, wherein the controller is further
- adapted to detect resistance to substantially linear motion of individual ones of the surface contour elements by comparing an expected rate of substantially linear motion to an actual rate of substantially linear motion.

18. The polymorphic surface system of claim 1, wherein the controller is further adapted to detect induced current across each circuit segment, wherein the induced current is induced by movement of the surface contour element under external force.

* * * * *